US006408156B1

(12) United States Patent
Miyazaki et al.

(10) Patent No.: US 6,408,156 B1
(45) Date of Patent: Jun. 18, 2002

(54) IMAGE RECORDING APPARATUS IN WHICH A PLURALITY OF IMAGES OF DIFFERENT COLORS ARE PRINTED IN REGISTRATION

(75) Inventors: Yoshitaka Miyazaki; Shuichi Fujikura; Hiroyuki Inoue; Kazuyoshi Yoshida, all of Tokyo; Daisuke Kobayashi, Tochigi; Shuichiro Ogata, Tosu, all of (JP)

(73) Assignee: Oki Data Corporation, Tokyo (JP)

( * ) Notice: Subject to any disclaimer, the term of this patent is extended or adjusted under 35 U.S.C. 154(b) by 1 days.

(21) Appl. No.: 09/638,915

(22) Filed: Aug. 16, 2000

(30) Foreign Application Priority Data

Aug. 20, 1999 (JP) ............................................ 11-233389

(51) Int. Cl.⁷ ................................................. G03G 15/01
(52) U.S. Cl. ...................................... 399/301; 347/116
(58) Field of Search ............................. 399/45, 46, 68, 399/64, 297, 298, 299, 301, 303, 389; 347/116

(56) References Cited

U.S. PATENT DOCUMENTS 5,523,823 A * 6/1996 Ashikaga ..................... 399/301
6,198,896 B1 * 3/2001 Nakayasu et al. .......... 399/301

* cited by examiner

*Primary Examiner*—Arthur T. Grimley
*Assistant Examiner*—Hoang Ngo
(74) *Attorney, Agent, or Firm*—Rabin & Berdo, P.C.

(57) ABSTRACT

An image recording apparatus includes a plurality of print engine aligned in a advance direction in which a transporting member transports a recording medium. A first one of the plurality of image-forming sections records a first detection pattern on the transporting member and a second one of the plurality of image-forming sections records a second detection pattern on the first detection pattern. A color shift detecting section detects the amount of color shift between the first and second ones of the print engines by measuring an intensity of light reflected by the first and second detection patterns. Based on the amount of color shift, a correcting section corrects a position of the image recorded on the recording medium. The detection pattern may be of different configurations, depending on the direction in which color shift occurs, i.e., traverse, advance, and oblique directions. The detection pattern includes a plurality of blocks aligned in a row, each of the plurality of blocks having at least one stripe.

24 Claims, 27 Drawing Sheets

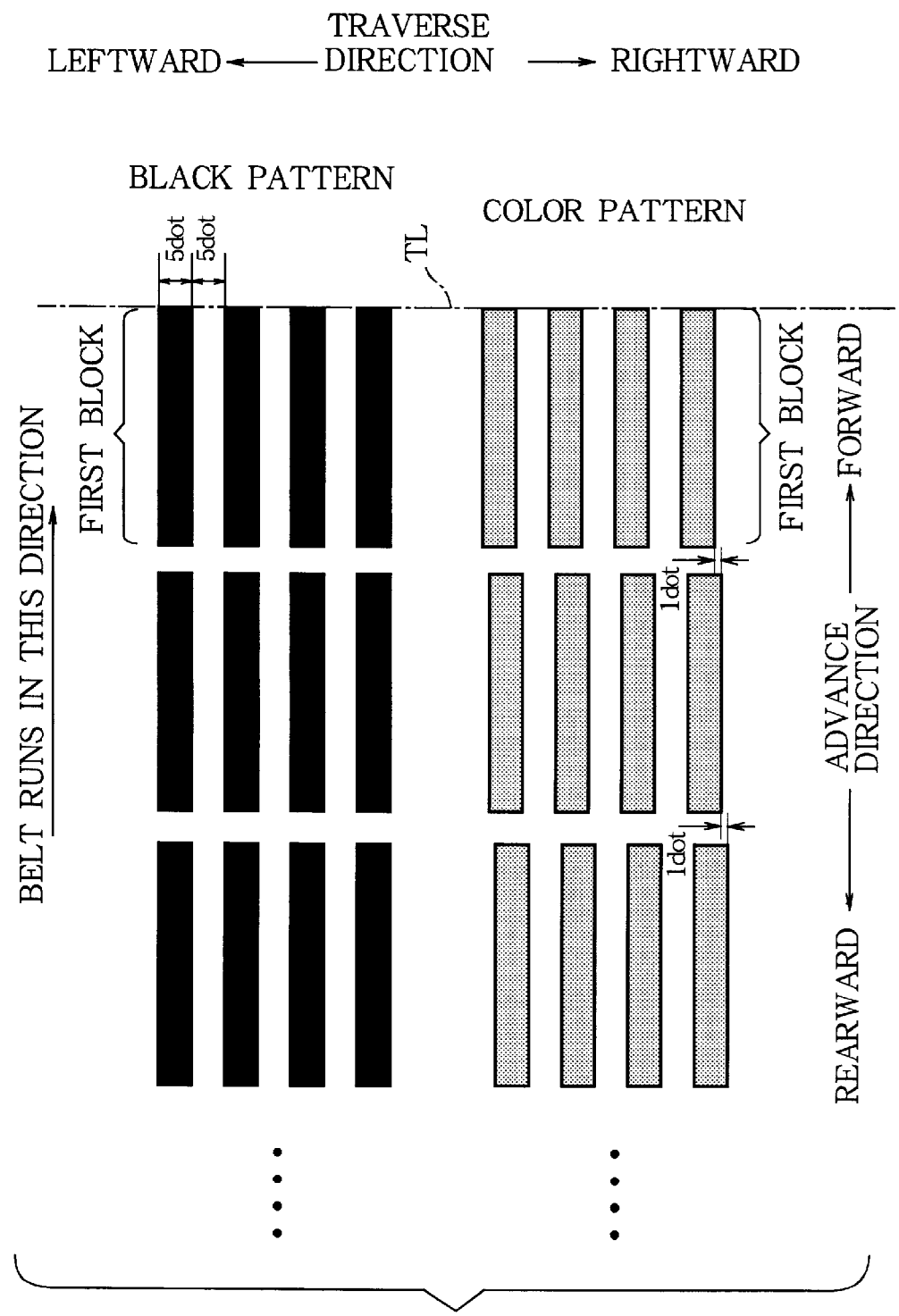

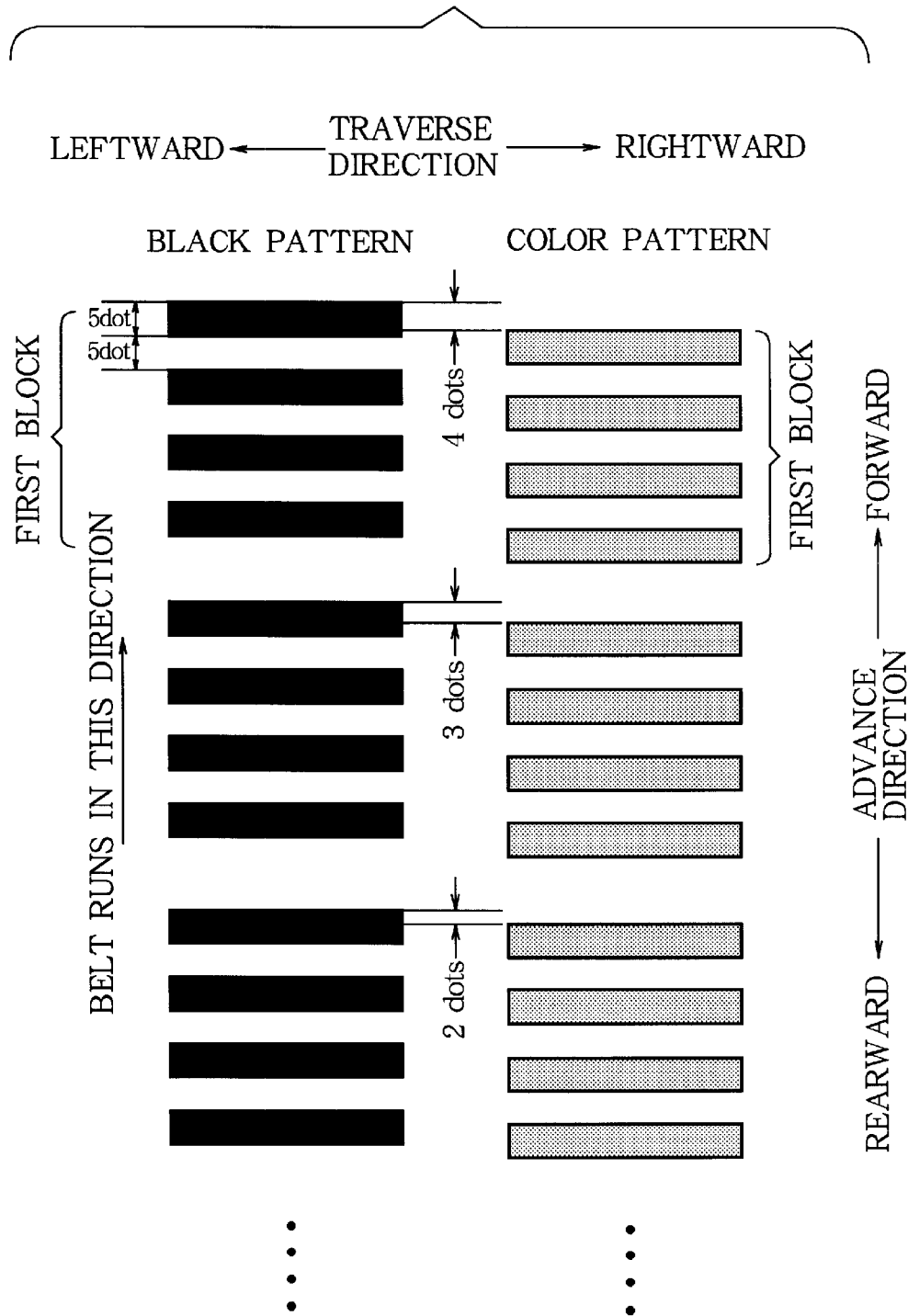

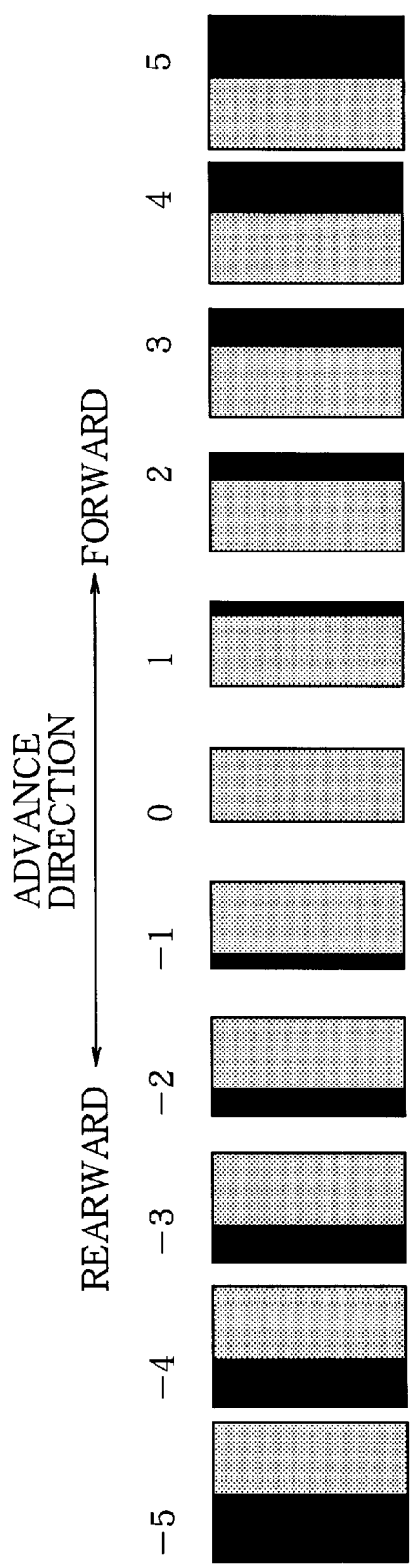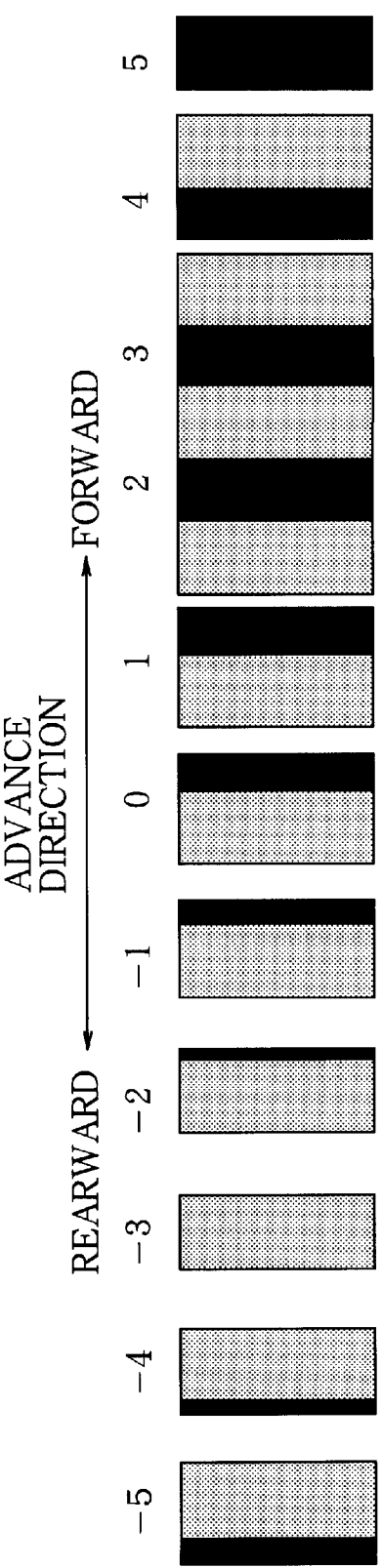

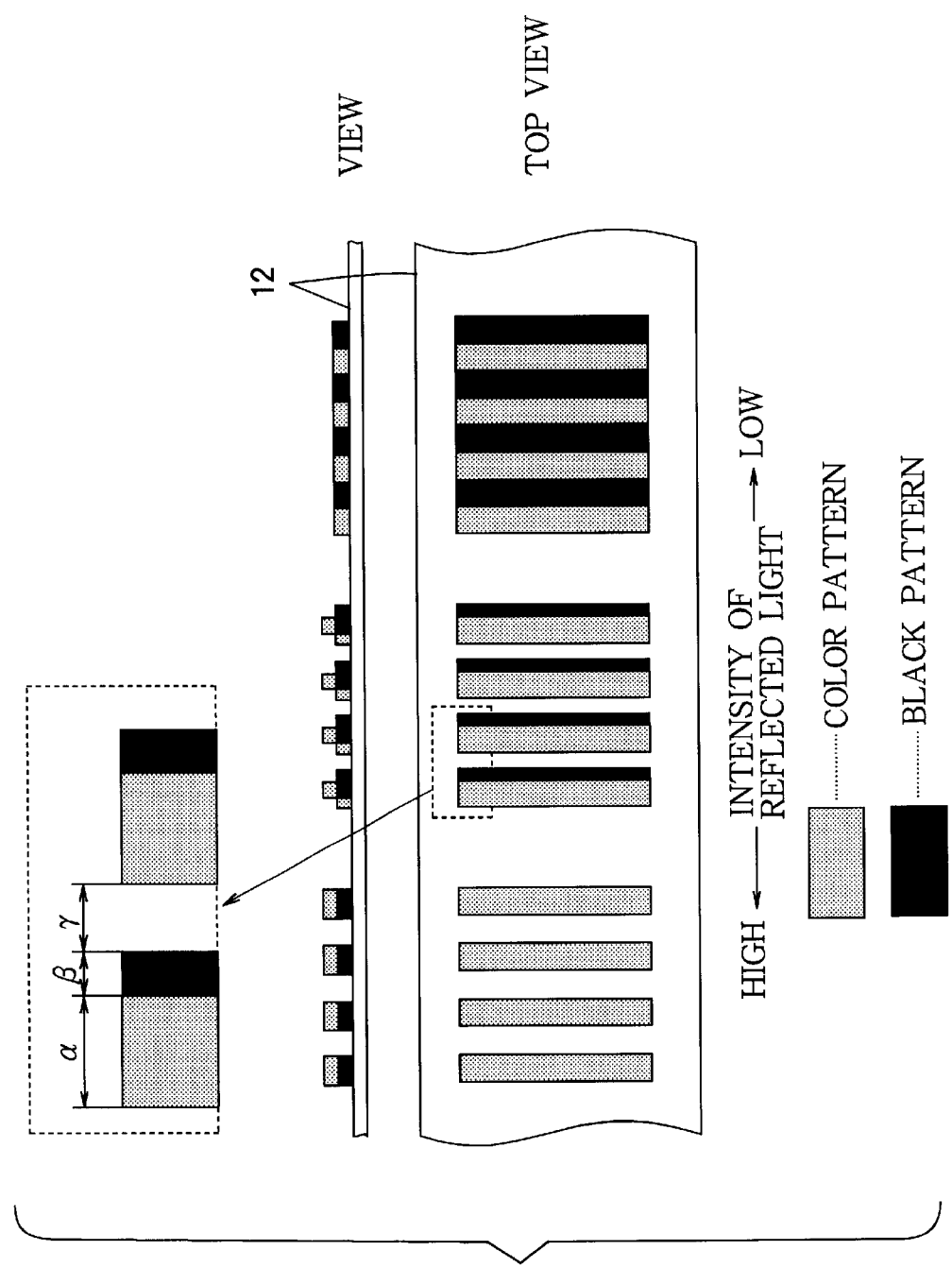

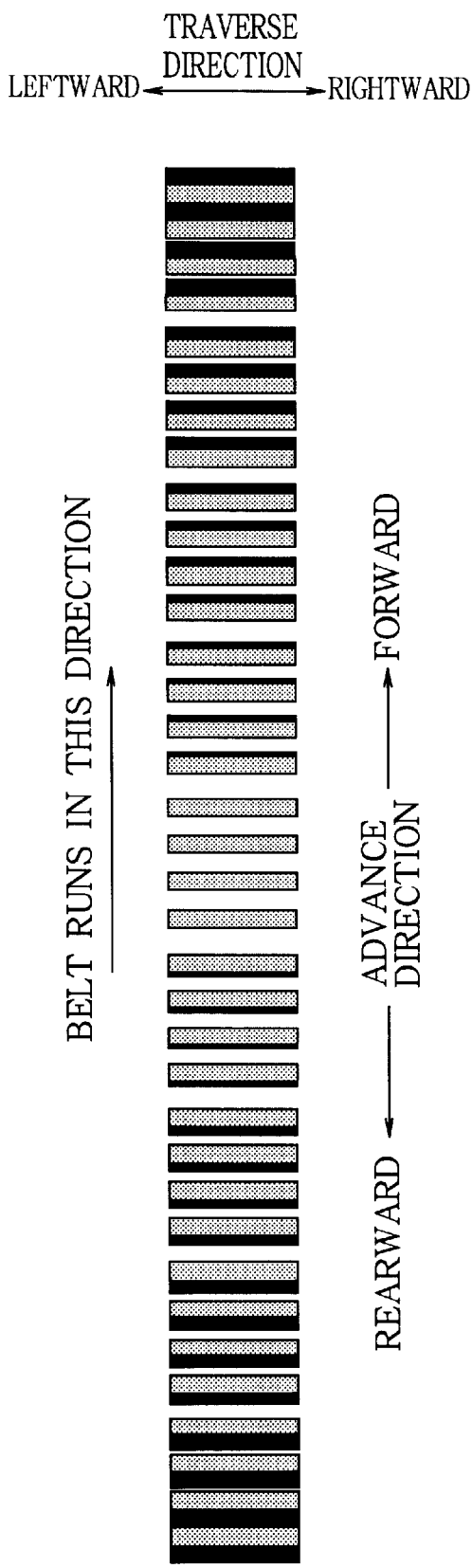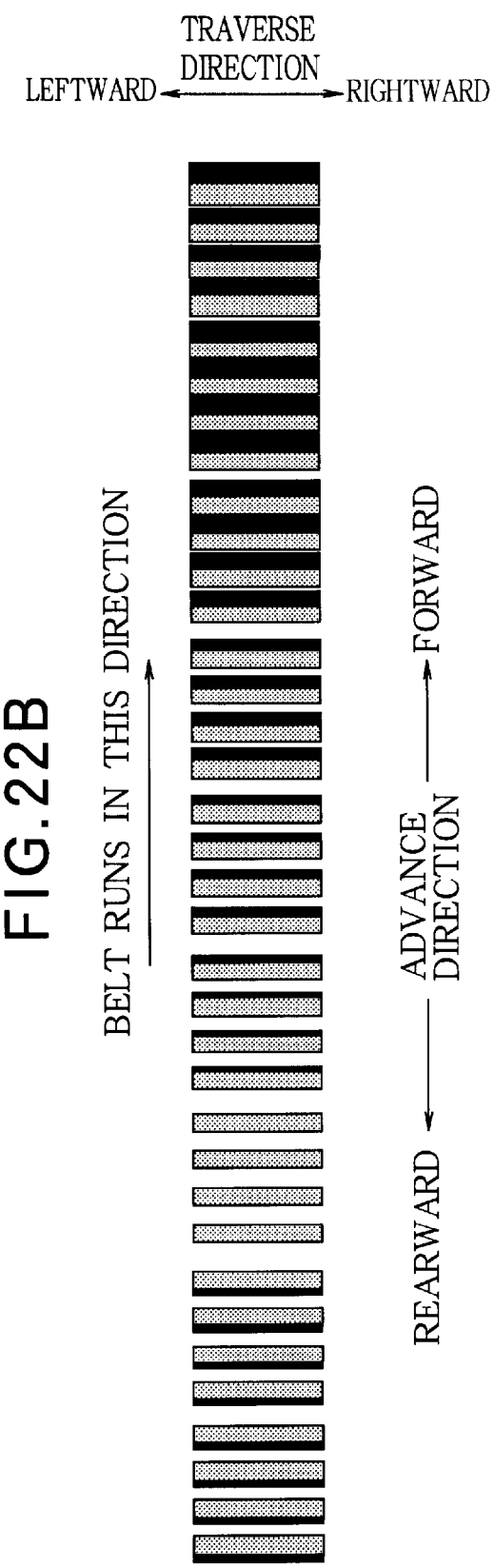

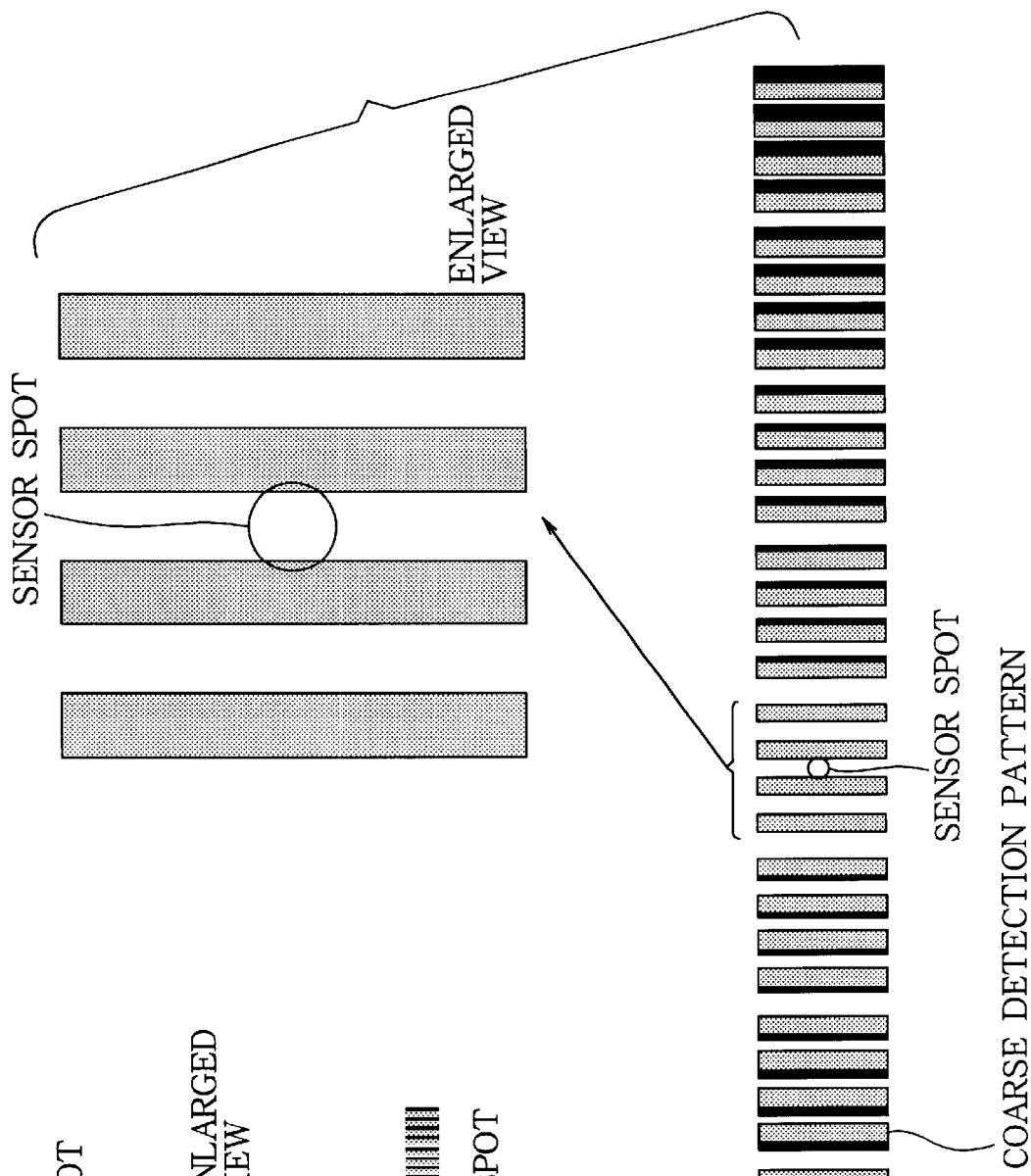
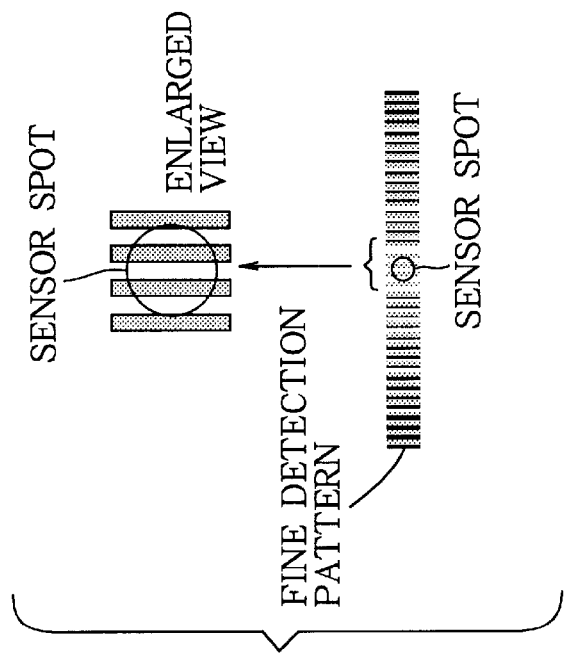

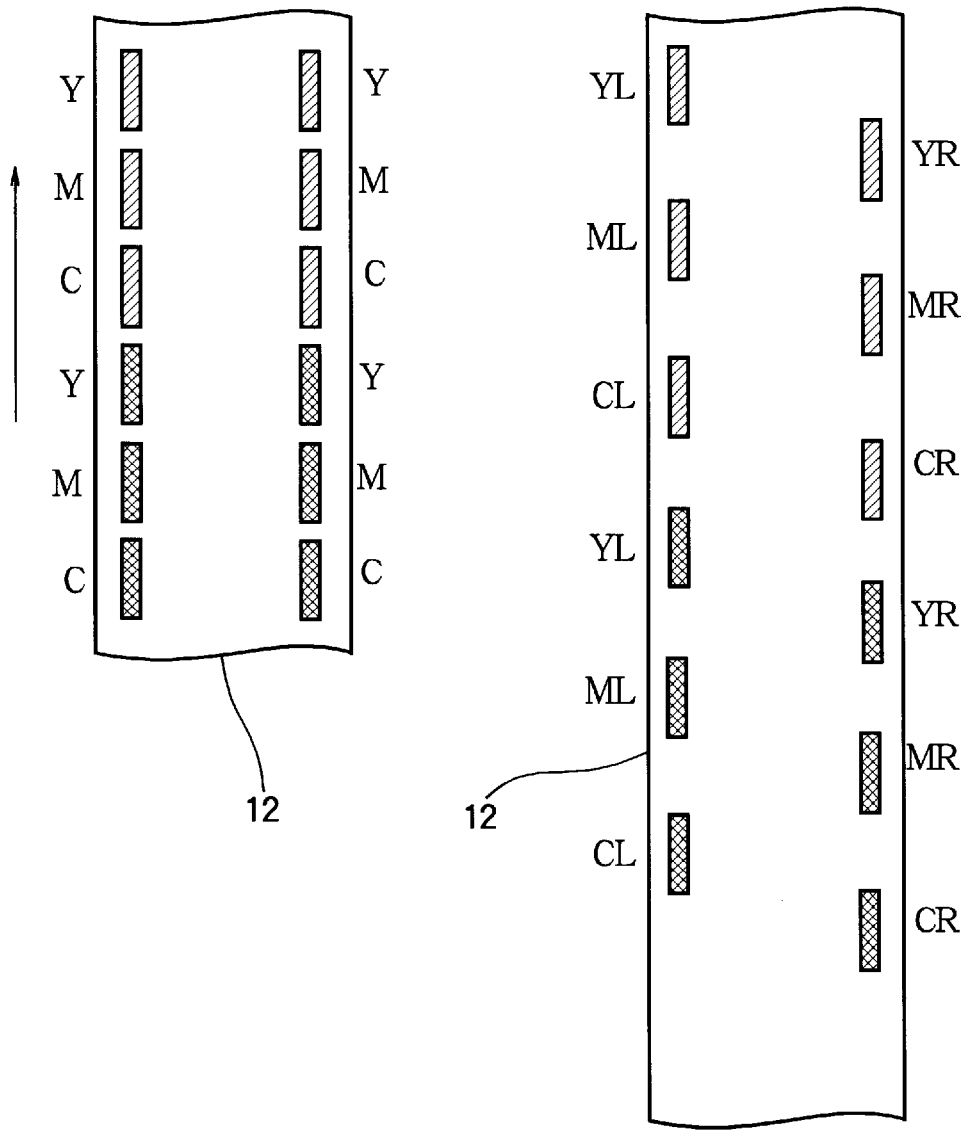

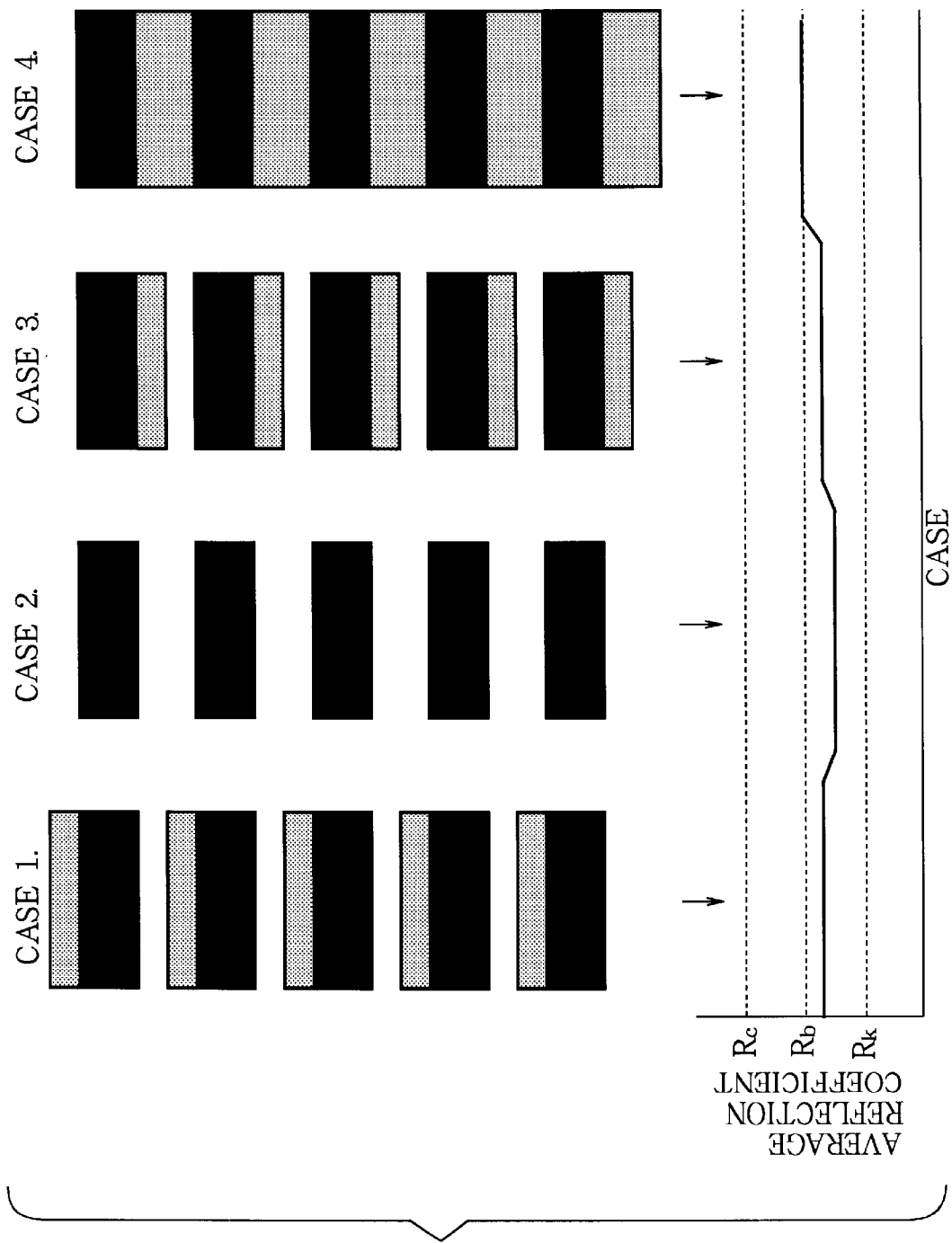

IMAGE RECORDING APPARATUS IN WHICH A PLURALITY OF IMAGES OF DIFFERENT COLORS ARE PRINTED IN REGISTRATION

BACKGROUND OF THE INVENTION

1. Field of the Invention

The present invention relates to an image recording apparatus such as a color electrophotographic printer that prints a color image on a recording medium, and more particularly to an image recording apparatus in which the positions of images of respective colors are corrected in order to print images of the respective colors at accurate locations.

2. Description of the Related Art

A color image recording apparatus such as a color electrophotographic printer incorporates a plurality of print engines. A tandem type color image recording apparatus incorporates four such print engines aligned in line and is capable of printing four color images on a sheet of paper statically attracted to a transport belt. The yellow, magenta, cyan, and black images are printed by successive printing operations in superposition on the sheet of paper. Thus, the tandem type color image recording apparatus achieves high speed printing.

With a print engine having an image recording element such as a miniaturized LED head, a fixedly mounted line head may be combined with an image drum unit, thereby miniaturizing the overall apparatus.

However, the respective recording heads may not be accurately positioned with respect to corresponding image drum units due to dimensional errors of the subassembly units and mounting errors encountered when the recording heads are mounted to the recording apparatus. As a result, the images of the respective colors are not accurately printed with respect to one another, causing color shift to occur.

If the mounting position of the recording head is shifted in a traverse direction in which the recording elements (e.g., LEDs) are aligned, color shift occurs in that direction. If the mounting position of the recording head is shifted in an advance direction in which the transport belt runs, color shift occurs in the advance direction. Color shift also occurs in a direction oblique to the traverse direction if the respective lines of recording elements are oblique with respect to the traverse direction.

In other words, deviations of mounting positions of the print engines in the advance, traverse, and oblique directions cause the deviations of the positions of printed images, thereby resulting in color shift. The degree of color shift varies with time for various reasons, and causes degradation of color print over time.

SUMMARY OF THE INVENTION

The present invention was made in view of the aforementioned problems.

An object of the invention is to provide an image recording apparatus in which color shifts among images of the respective colors are detected and the color shifts are corrected for stable printing operation of the color images.

An image recording apparatus includes a plurality of print engines that print images of different colors in registration to form a color image. The print engines are aligned in an advance direction in which a recording medium is transported. A transporting member transports a recording medium in the advance direction. Each of the plurality of print engines records an image of a corresponding one of different colors onto a recording medium. The print engine also prints a detection pattern of the corresponding one of different colors on the transporting member. A color shift detecting section detects an amount of color shift based on two detection patterns recorded on the transporting member. A correcting section corrects a position of the image recorded on the recording medium, the position being corrected in accordance with the amount of color shift.

A first one of the plurality of image-forming sections records a first detection pattern and a second one of the plurality of image-forming sections records a second detection pattern on the first detection pattern. The color shift detecting section detects the amount of color shift based on the first and second detection patterns.

The color shift detecting section detects the amount of color shift by measuring an intensity of light reflected by the detection pattern.

The color shift detecting section detects the amount of color shift of a corresponding color based on the detection pattern recorded on the transporting member. The detection pattern may be one of a first detection pattern for detecting color shift in the advance direction, a second detection pattern for detecting color shift in the traverse direction perpendicular to the advanced direction, and a third detection pattern for detecting color shift in an oblique direction at an angle with the traverse direction.

The detection pattern includes a plurality of blocks aligned in a row, each of the plurality of blocks having at least one stripe. A first image-forming section records a first detection pattern and a second image-forming section records a second detection pattern on the transporting member. The first detection pattern has the plurality of blocks each of which is shifted with respect to adjacent blocks by a first predetermined distance in a predetermined direction. The second detection pattern has the plurality of blocks each of which is shifted with respect to adjacent blocks by a second predetermined distance in the predetermined direction. The first detection pattern and the second detection pattern are recorded one over the other.

The color shift detecting section includes a pair of detectors that measure an intensity of light reflected back from the third detection pattern, and a circuit that selectively receives outputs of the pair of detectors.

The third detection pattern may be aligned in two rows in a staggered configuration such that each of the two rows is at an end portion of the transporting member in the traverse direction.

The detection pattern may be one of a plurality of detection patterns that have a plurality of levels of resolution. The color shift detecting section detects the amounts of color shift based on the plurality of detection patterns. The correcting section corrects a position of the image recorded on the recording medium in accordance with the amounts of color shift, the position being first corrected based on a low level of resolution and then based on a high level resolution.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 5 illustrates three of a plurality of blocks of the black detection pattern and color detection pattern to be printed on the carrier belt;

FIG. 7 is an enlarged view of detection patterns used for detecting color shift in the advance direction, illustrating only three of a plurality of blocks of the black and color detection patterns;

FIG. 8A illustrates the black and color detection patterns of FIG. 7 printed on the carrier belt when there are no positional errors between the two patterns;

FIG. 8B illustrates the black and color detection patterns of FIG. 7 printed on the carrier belt when the color detection pattern is shifted from the black detection pattern by two dots rearward in the advance direction;

FIG. 9A illustrates the black pattern and color detection pattern printed on the carrier belt when there are no positional errors between the two patterns;

FIG. 9B illustrates the black and color detection patterns printed on the carrier belt when the color detection pattern is shifted from the black detection pattern by two dots rearward in the advance direction.

FIG. 13 illustrates degree of overlap of the black detection pattern and color detection pattern versus intensity of light reflected back by the printed pattern;

FIGS. 22A and 22B illustrate two coarse detection patterns that detect different amounts of color shift in the advance direction;

FIG. 23A is an enlarged view of a block of the fine detection pattern;

FIG. 23B is an enlarged view of a block of the coarse detection pattern;

FIG. 26A illustrates the conventional detection pattern for detecting color shift in the multiple level (fine adjustment of print position/coarse-adjustment of print position);

FIG. 26B illustrates the arrangement of the detection pattern according to the third embodiment;

FIG. 31 illustrates four different CASEs 1–4 in which the black detection pattern is printed on the color detection pattern with four different degrees of overlap.

DETAILED DESCRIPTION OF THE INVENTION

The present invention will be described in detail by way of example.

First Embodiment

{Overall Construction}

In the specification, the following three terms are used to cover different directions. The term "advance direction" is used to cover a direction in which the carrier belt runs. The term "traverse direction" is used to cover a direction perpendicular to the advance direction. The "oblique direction" is used to cover a direction at a slight angle with the traverse direction such that the oblique direction has a component in the advance direction and a component in the traverse direction.

Figure 1:
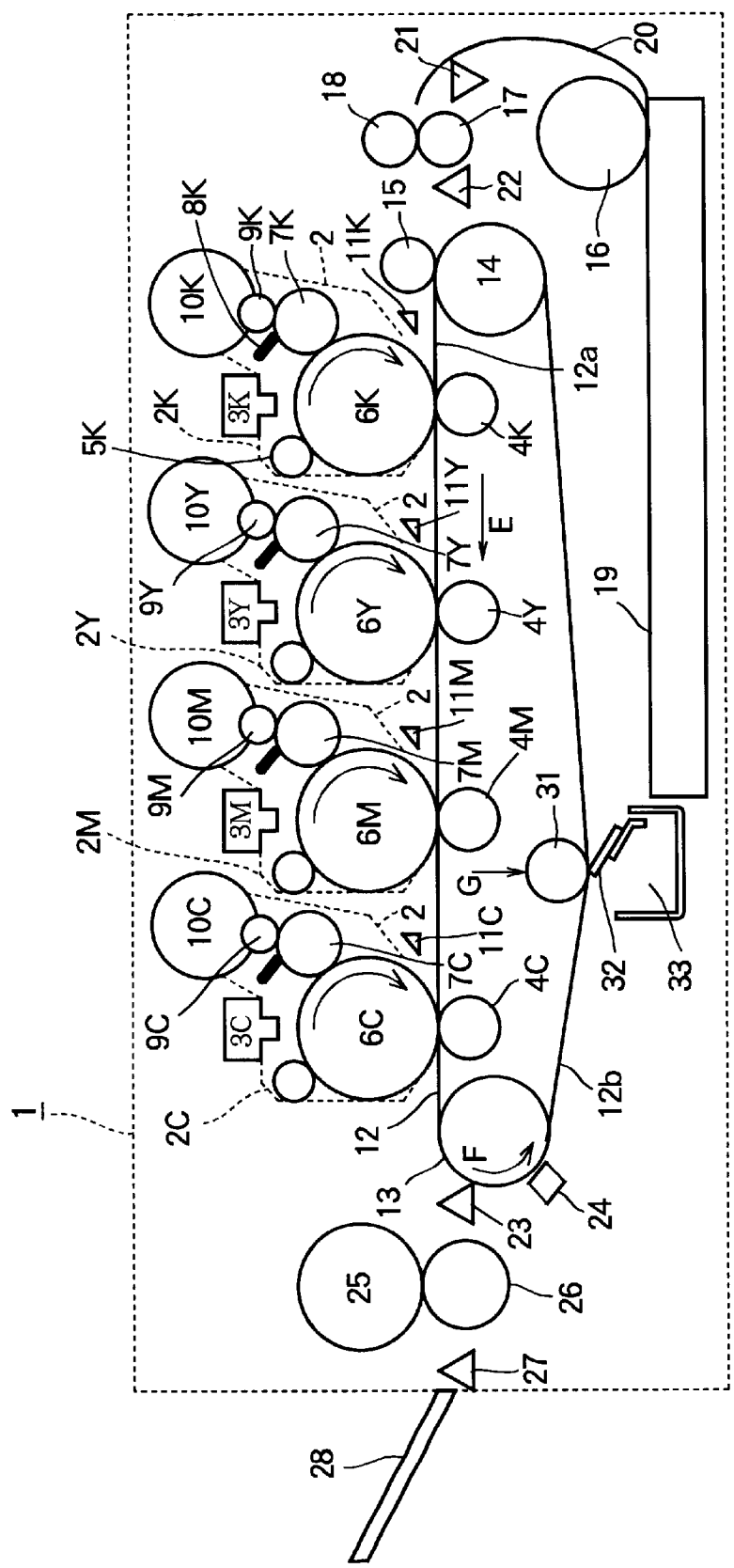
FIG. 1 is a block diagram, illustrating a general construction of a color image recording apparatus.

FIG. 1 is a block diagram, illustrating a general construction of a color image recording apparatus.

Referring to FIG. 1, a color image recording apparatus 1 includes four independent print engines 2K, 2Y, 2M, and 2C aligned along a transport path (advance direction) that extends from a print medium insertion port to a print medium discharging port.

The print engines 2K–2C are electrophotographic LED type printing mechanisms for printing black, yellow, magenta, and cyan images, respectively.

The print engines 2K, 2Y, 2M, and 2C are of the same construction. Each print engine 2 primarily includes: a charging roller 5; a photoconductive drum 6 whose surface is uniformly charged by the charging roller 5; the LED head 3 for forming an electrostatic latent image on the photoconductive drum 6; a developing roller 7 that develops the electrostatic latent image into a toner image; a developing blade 8; a sponge roller 9; and a toner cartridge 10.

The image forming operation of the print engine 2K will be described. Toner supplied from the toner cartridge 10K is delivered to the developing blade 8K via the sponge roller 9K. A very thin layer of toner is thus deposited on the circumferential surface of the developing roller 7K. The toner is rubbed between the developing roller 7K and the developing blade 8K to become triboelectrically charged. The sponge roller 9K is used to supply a proper amount of toner to the developing blade 8K. When the developing roller 7K contacts the photoconductive drum 6K, the toner on the developing roller 7K is brought into contact with the surface of the photoconductive drum 6K.

Although the detail of the LED head 3K is not shown, the LED head 3K includes LED arrays, drive ICs for driving the LED arrays, a printed circuit board on which a group of registers for holding print data is mounted, and a lens array for focusing the light emitted from the LED arrays. The LED head 3K emits light in accordance with image data received via an interface section to illuminate the surface of the photoconductive drum 6K, thereby forming an electrostatic latent image on the photoconductive drum 6K. The electrostatic latent image on the photoconductive drum 6K attracts toner deposited on the developing roller 7K by the Coulomb force to become a toner image. A transport belt 12 runs between the photoconductive drum 6K and the transfer roller 4K.

The yellow, magenta, and cyan print engines are of the same construction as the black print engine 2K. The toner cartridges 10K, 10Y, 10M, and 10C hold black, yellow, magenta, and cyan toner therein, respectively.

The LED head 3K, 3Y, 3M, and 3C receive black, yellow, magenta, and cyan image signals, respectively. Neutralizing light sources 11K, 11Y, 11M, and 11C are disposed between the developing sections and transfer sections and neutralize the surfaces of photoconductive drums 6K, 6Y, 6M, and 6C, respectively.

The transport belt 12 is a seamless, endless belt made from a semiconductive plastic film with high resistance, and is entrained about a drive roller 13 and a driven roller 14. A belt motor, not shown, drives the drive roller 13 in rotation in a direction shown by arrow F. The upper half of the carrier belt 12 runs between the photoconductive drums 6K-6C and transfer rollers 4k–4C of the respective print engines.

There is provided a paper feeding mechanism at a lower right corner of the color image recording apparatus. The paper feeding mechanism includes a hopping roller 16, registry roller 17, and paper cassette 19, and feeds print paper S into the transport path. The hopping roller 16 cooperates with a paper separator, not shown, to feed the print paper S accommodated in the paper cassette 19. The paper S is fed through a guide 20 to the registry roller 17 which in turn cooperates with a pinch roller 18 opposing the registry roller 17 to correct the position of the print paper if it is skewed. The print paper S is then fed between an attraction roller 15 and the carrier belt 12. The attraction roller 15 presses the print paper S against the driven roller 14 and causes the print paper S to be charged so that the print paper S is electrostatically attracted to the carrier belt 12.

Sensors 21 and 22 are disposed upstream and downstream of the registry roller 17 with respect to the transport direction (i.e., advance direction) of paper S. The sensors 21 and 22 detect the paper S. A sensor 23 faces the carrier belt 12 in contact with the drive roller 13, and detects a trailing end of the paper S that fails to be separated from the carrier belt 12 at the end of the printing operation. A reflection detector 24 is located downstream of the sensor 23 with respect of the direction in which the carrier belt 12 runs. The reflection detector 24 includes a light emitting element and a light receiving element. The light emitting element emits light toward the carrier belt 12 and the light receiving element receives the light reflected back from the surface of the carrier belt 12, thereby generating a detection signal indicative of the intensity of the reflected light.

A cleaning mechanism is disposed below the carrier belt 12 and includes a tension roller 13, a cleaning blade 32, and a waste toner tank 33. The lower half 12b of the carrier belt 12 is sandwiched between the tension roller 31 and the cleaning blade 32. The tension roller 31 presses the carrier belt 12 in a direction shown by arrow G. The cleaning blade 32 is made of a flexible rubber material or a plastic material and scratches the toner deposited on the surface of the carrier belt 12 into a waste toner tank 33.

Figure 2:
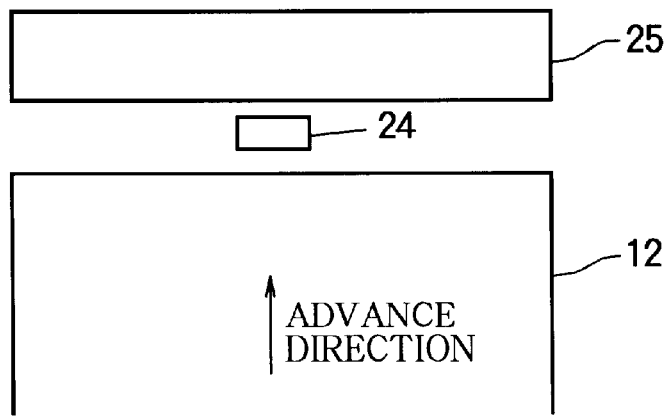
FIG. 2 illustrates the position of the reflection detector 24 that detects color shift occurring both in the traverse direction and in the advance direction.
Figure 3:
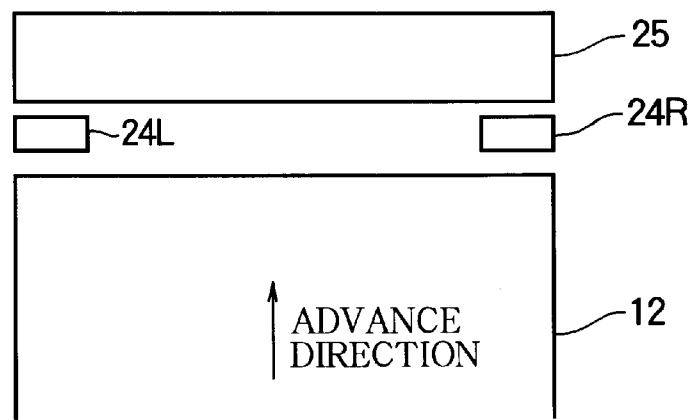
FIG. 3 illustrates the positions of the reflection detectors that detects color shift occurring in an oblique direction, oblique to the traverse direction.

FIGS. 2 and 3 illustrate the mounting locations of the reflection detector 24.

FIG. 2 illustrates the position of the reflection detector 24 that detects color shift occurring both in the traverse direction and in the advance direction.

FIG. 3 illustrates the positions of the reflection detectors 24R and 24L that detects color shift occurring in an oblique direction, oblique to the traverse direction.

Referring to FIGS. 2 and 3, the reflection detector 24 is disposed in the middle in the traverse direction, i.e., a direction perpendicular to the advance direction. The reflection detectors 24R and 24L are located at ends of the carrier belt 12 in the traverse direction. A heat roller 25 is a part of a fixing mechanism that fuses the toner images transferred onto the paper S.

The fixing mechanism is located downstream of the print engine for a cyan image with respect to the transport path of paper S. The fixing mechanism includes the heat roller 25 that heats the toner images on the paper S, a pressure roller 26 that cooperates with the heat roller 25 to pressurize the paper S therebetween. Disposed further downstream of the fixing mechanism is a discharge sensor 27, which monitors the exit side of the fixing mechanism to detect jammed paper and the paper stuck to the heat roller 25. The paper that has passed through the fixing mechanism is then discharged to a paper stacker 28 through a paper exit.

{Correcting the Print Position}

Figure 4:
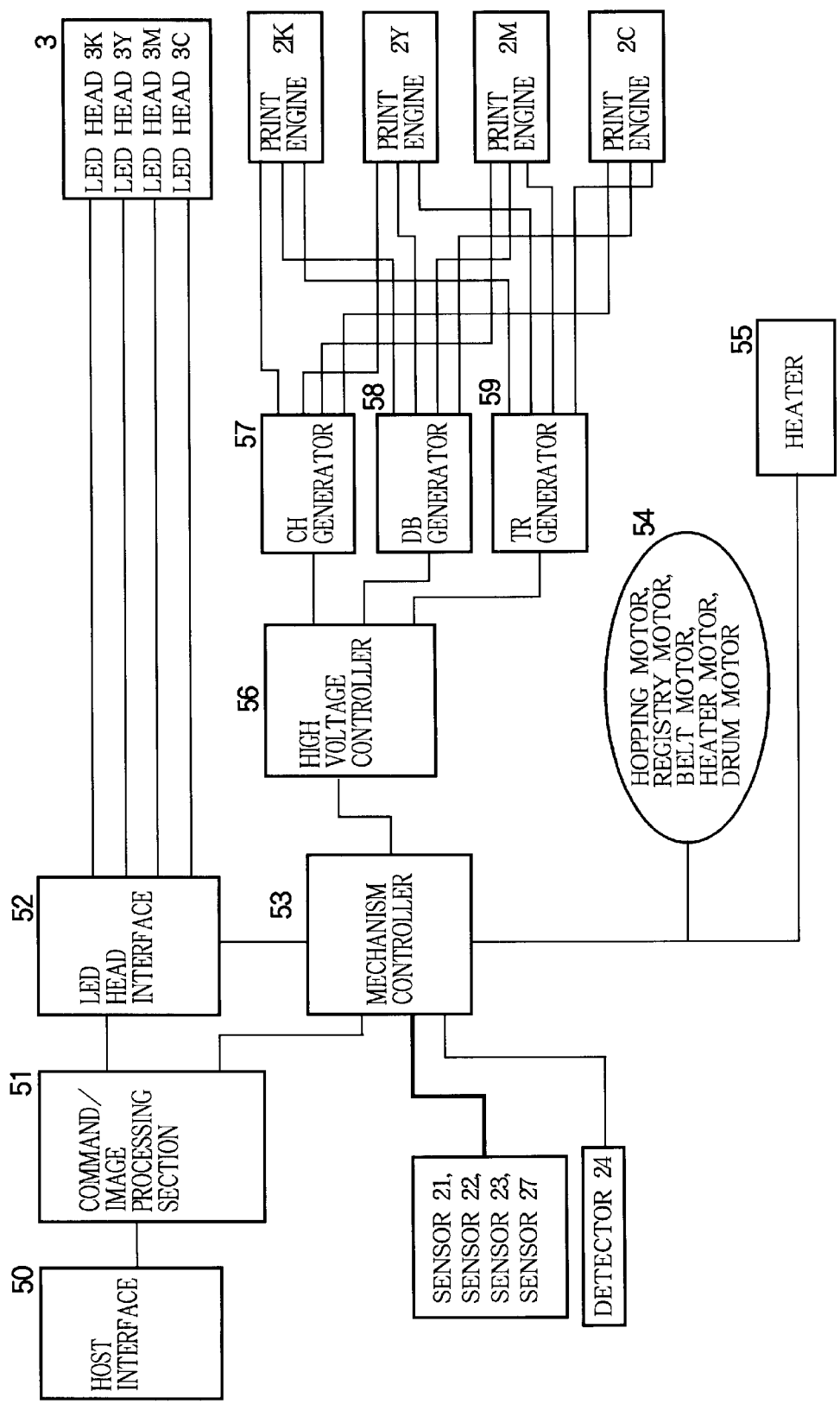
FIG. 4 is a block diagram, illustrating the overall configuration of a print control circuit that corrects the print positions both of images in the advance direction and in the traverse direction.

FIG. 4 is a block diagram, illustrating the overall configuration of a print control circuit that corrects the print positions both of images in the advance direction and in the traverse direction.

Referring to FIG. 4, a host interface 50 includes connectors and chips for communicating with an external apparatus, and interfaces with a host computer, not shown. A command/image processing section 51 decodes commands and image data received from the host computer to translate the image data into a bit-map data. The command/image processing section 51 primarily includes a microprocessor, a RAM, and exclusive hardware for bit-map translation, and controls the overall operation of the color image recording apparatus 1. An LED head interface 52 includes a semi-custom LSI and a RAM. The LED head interface 52 processes the bit-map data, translated by the command/image processing section 51, into a format that can directly drive the LED heads 3K, 3Y, 3M, and 3C.

The mechanism controller 53 includes a microprocessor, a program ROM, and various interfaces. Upon the commands from the command/image processing section 51, the mechanism controller 53 controllably drives the respective motors 54 while monitoring signals received from the sensors 21–23 and 27 and reflection detector 24. The mechanism controller 53 also controls the energization of the heater 55, the mechanisms of the print engines, and high voltages. The motors 54 include a hopping motor, a registry motor, a belt motor, drum motors for print engines 2K, 2Y, 2M, and 2C, a heater motor for driving the heat roller 25, and drivers for driving these motors. The heater 55 takes the form of, for example, a halogen lamp disposed in the heat roller 25. A thermistor, not shown, is disposed near the heat roller 25 to detect the temperature of the heat roller 25, thereby controlling the fixing temperature.

A high voltage controller 56 includes a microprocessor or custom LSI, and generates a charging voltage (CH), a developing bias (DB), and a transfer voltage (TR) for the respective print engines 2K, 2Y, 2M, and 2C. The high voltage controller 56 is connected to a CH generator 57, a DB generator 58, and a TR generator 59. The high voltage controller 56 controls the CH generator 57 to generate and shut off the charging voltage supplied to the respective print engines. The high voltage controller 56 controls the DB generator 58 to generate the developing bias voltage supplied to the respective print engines. The high voltage controller 56 controls the TR generator 59 to generate the transfer voltage supplied to the respective print engines. The TR generator 59 includes a current/voltage detecting circuit, not shown, which performs a constant current control or constant voltage control of the transfer roller.

As mentioned above, the print position correcting section according to the first embodiment has the following functions:

(1) The LED head interface 52 transfers a later described detection pattern signal to the print heads 3K, 3Y, 3M, and 3C of the respective print engines 2K, 2Y, 2M, and 2C;

(2) The respective print engines print the detection patterns of corresponding colors on the carrier belt 12; and (3) The reflection detector 24 reads the detection patterns printed on the carrier belt 12 to detect a degree of color shift of respective print engine with respect to one of the print engines.

{Detection Patterns}

A detection pattern for detecting color shift will be described.

FIG. 5 illustrates three of a plurality of blocks of the black detection pattern and color detection pattern to be printed on the carrier belt 12.

Figure 6A:
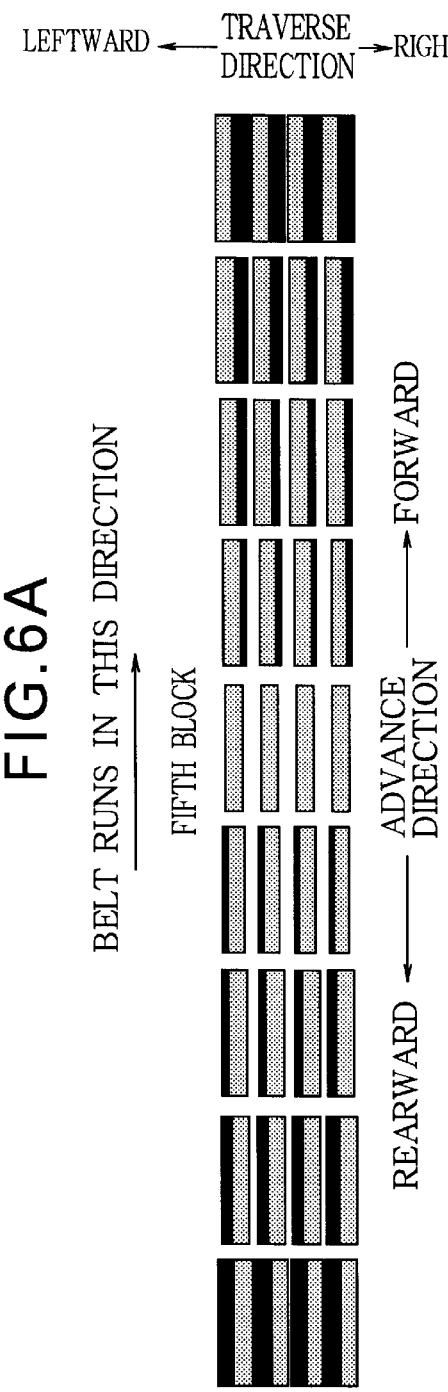
FIG. 6A illustrates the entire printed black and color detection patterns of FIG. 5 when there is no positional error between the two patterns.
Figure 6B:
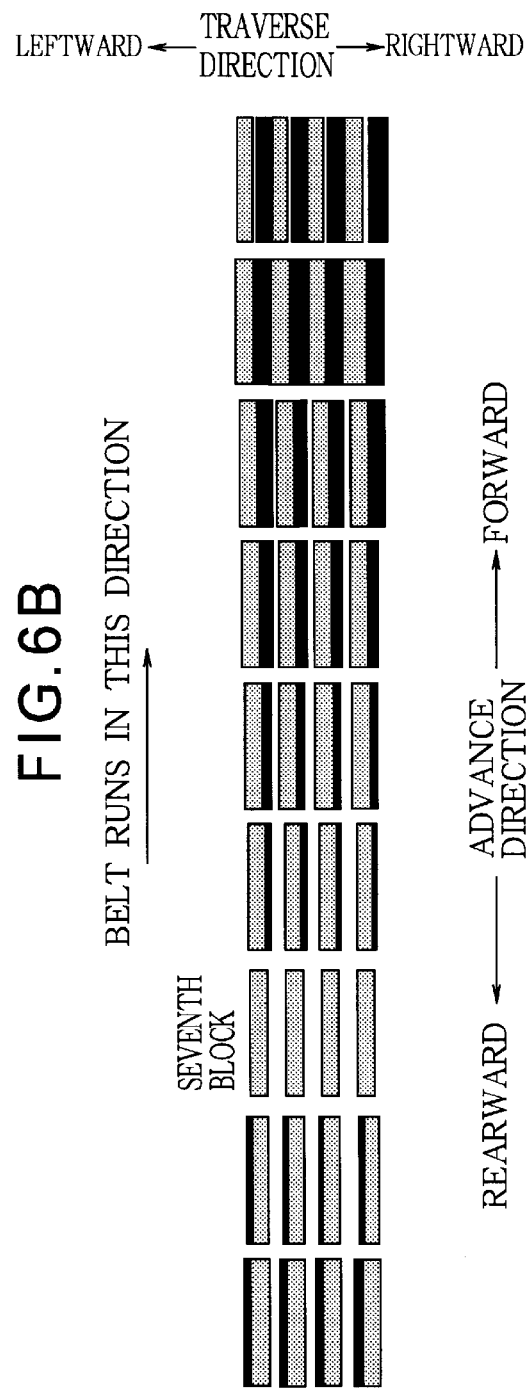
FIG. 6B illustrates the entire printed black and color detection patterns of FIG. 5 when the color detection pattern deviates from the black detection pattern by two dots leftward in the traverse direction.

FIGS. 6A and 6B illustrate the entire black detection pattern and color detection pattern when they are printed one over the other in order to detect color shift in the traverse direction.

The color detection pattern of FIG. 5 is any one of yellow, magenta, and cyan detection patterns. Here, the black detection pattern and color detection pattern are shown as separate patterns, but in practice, the black detection pattern is first printed on the carrier belt 12 and then one of yellow, magenta, and cyan detection patterns is printed over the black detection pattern. FIG. 5 assumes that carrier belt 12 runs forward (rightward FIG. 5).

The black detection pattern is first printed. As shown in FIG. 5, the black detection pattern includes blocks aligned in the advance direction. Each of the blocks includes four parallel stripes aligned in the traverse direction. As shown in FIGS. 6A and 6B, nine blocks are aligned in the advance direction with a predetermined space therebetween. Each of the stripes has a 5-dot width and extends in the advance direction.

With the color detection pattern of FIG. 5, each block is configured in the same way as that of the black detection pattern. The top block of the color detection pattern is aligned with the position TL of the top block of the black detection pattern in the advance direction. The color detection pattern is positioned with respect to the black detection pattern such that the top block of the color detection pattern is shifted leftward in the traverse direction by a distance equivalent to four dots from the black detection pattern. The second block and onward are shifted rightward in the traverse direction with respect to the first block of the color detection pattern in increments of one dot.

FIG. 6A illustrates the entire printed black and color detection patterns of FIG. 5 when there is no positional error between the two patterns.

FIG. 6B illustrates the entire printed black and color detection patterns of FIG. 5 when the color detection pattern deviates from the black detection pattern by two dots leftward in the traverse direction.

As shown in FIGS. 6A and 6B, the black detection pattern is first printed on the carrier belt 12 and then the color detection pattern over the black detection pattern. The degree of overlap of two patterns varies from block to block, depending on the positional error of the color detection pattern with respect to the black detection pattern in the traverse direction. When the color detection pattern overlaps with the black detection pattern, the black detection pattern underlying the color detection pattern is not seen through the color detection pattern because two patterns have not been fused yet.

Referring to FIG. 6A, the black and color detection patterns completely overlap with each other at the fifth block thereof from the leading end in the advance direction. Referring to FIG. 6B, the black and color detection patterns completely overlap with each other at the seventh block thereof from the leading end in the advance direction. In this manner, the two patterns completely overlap with each other at different blocks for a positional error in increments of one dot. The use of this nine-block pattern allows detecting of positional errors up to four dots both leftward and rightward in the traverse direction.

{Detection Pattern for the Advance Direction}

Next, the detection pattern used for correcting the print position in the advance direction will be described.

FIG. 7 is an enlarged view of detection patterns used for detecting color shift in the advance direction, illustrating only three of a plurality of blocks of the black and color detection patterns.

FIGS. 8A and 8B illustrate the entire detection patterns of FIG. 7, printed on the carrier belt 12.

The color detection pattern of FIG. 7A illustrates one of the color detection patterns (yellow, magenta, cyan). Just as in the detection of color shift in the traverse direction, the black detection pattern is first printed on the carrier belt 12 and then the color detection pattern over the black detection pattern. The black detection pattern includes nine blocks aligned in the advance direction with predetermined intervals. Each block consists of four stripes of a five-dot width, the stripes being aligned in the advance direction and spaced apart by a distance equivalent to five dots.

As shown in FIG. 7, blocks of the color detection pattern are of the same structure as those of the black detection pattern. However, the first block of the color detection pattern is shifted by four dots rearward in the advance direction with respect to the first block of the black detection pattern. The second block of the color detection pattern is shifted by three dots with respect to the second block of the black detection pattern. The third block of the color detection pattern is shifted by two dots with respect to the third block of the black detection pattern. In other words, each block of the color detection pattern is shifted by one dot less than its adjacent one with respect to a corresponding block of the black detection pattern in the advance direction. It is to be noted that the ninth block of the color detection pattern is shifted four dots forward in the advance direction with respect to the ninth block of the black detection pattern.

FIG. 8A illustrates the black and color detection patterns of FIG. 7 printed on the carrier belt 12 when there are no positional errors between the two patterns.

FIG. 8B illustrates the black and color detection patterns of FIG. 7 printed on the carrier belt 12 when the color detection pattern is shifted from the black detection pattern by two dots rearward in the advance direction.

As shown in FIGS. 8A and 8B, the degree of overlap of the black detection patterns and color detection pattern varies from block to block, depending on positional errors of the color detection pattern relative to the black detection pattern in the advance direction. Referring to FIG. 8A, the black and color detection patterns completely overlap with each other at their fifth blocks from the leading end in the advance direction. Referring to FIG. 8B, the black and color detection patterns completely overlap with each other at their seventh blocks from the leading end in the advance direction. The use of this nine-block pattern allows detecting of positional errors up to four dots both forward and rearward in the advance direction.

The detection patterns of FIG. 8 have blocks each of which includes four stripes and are used to detect color shift in the advance direction. However, a detection pattern may be formed of blocks each of which includes only one stripe.

FIGS. 9A and 9B show one such detection pattern for detecting color shift in the advance direction.

FIG. 9A illustrates the black pattern and color detection pattern, printed on the carrier belt 12 when there are no positional errors between the two patterns.

FIG. 9B illustrates the black and color detection patterns printed on the carrier belt 12 when the color detection pattern is shifted from the black detection pattern by two dots rearward in the advance direction.

The detection patterns of FIGS. 9A and 9B provide a detection pattern having a shorter total length, while still ensuring detection of the same amount of color shift. Thus, color shift can be detected in a shorter time at the expense of decreased detection accuracy. In practice, it is desirable that coarse detection is carried out by using the detection patterns of FIGS. 9A and 9B and then fine detection is performed by using those of FIG. 5 and FIGS. 6A and 6B.

{Detection Pattern for the Oblique Direction}

A detection pattern and a print controller for detecting color shift in the oblique direction will now be described.

Figure 10:
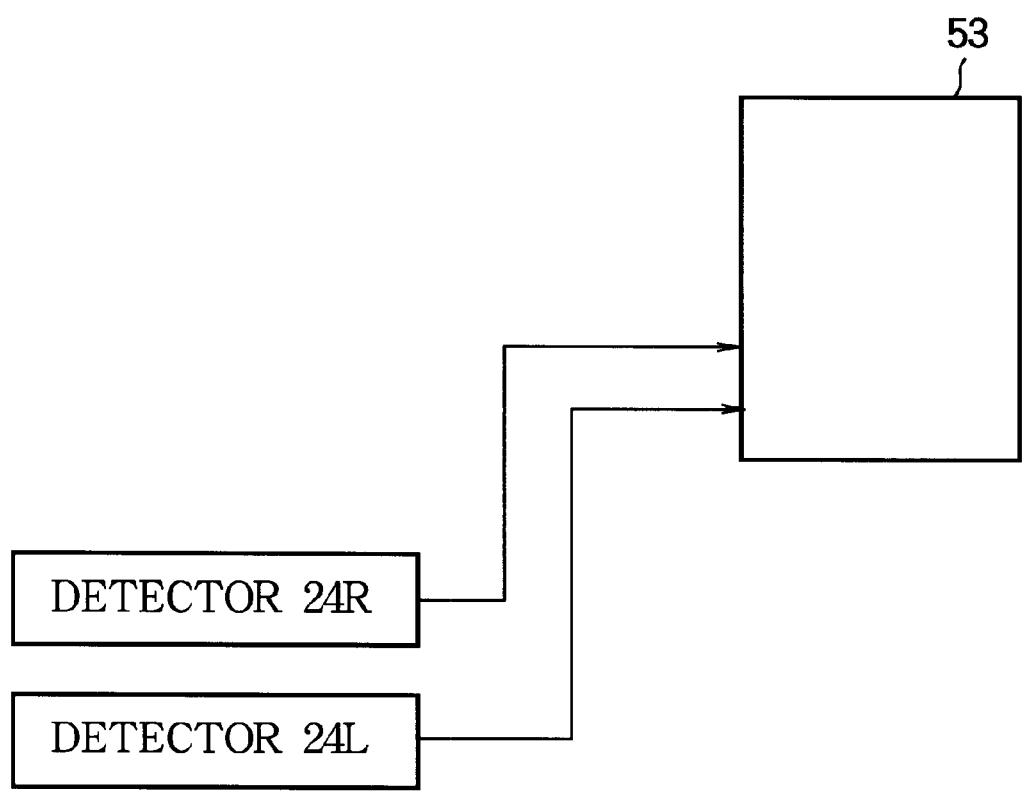
FIG. 10 is a block diagram, illustrating reflection detectors connected to the mechanism controller.

FIG. 10 is a block diagram, illustrating reflection detectors 24R and 24L connected to the mechanism controller 53.

The print controller for detecting color shift in the oblique direction differs from that in FIG. 4 in that the signals indicative of color shift, are generated by the reflection detectors 24R and 24L. Thus, the same elements as those in FIG. 4 have been given the same reference numerals and the description thereof is omitted. Just like the correction control shown in FIG. 4, the print controller transfers pattern signals (i.e., black detection pattern and color detection pattern) from the LED head interface 52 to the LED heads 3K, 3Y, 3M, and 3C of the print engines 2K, 2Y, 2M, and 2C. Then, the print controller causes the print engines to print the detection patterns on the carrier belt 12, and then reads the printed detection patterns via the reflection detectors 24R and 24L in FIG. 3.

Figure 11:
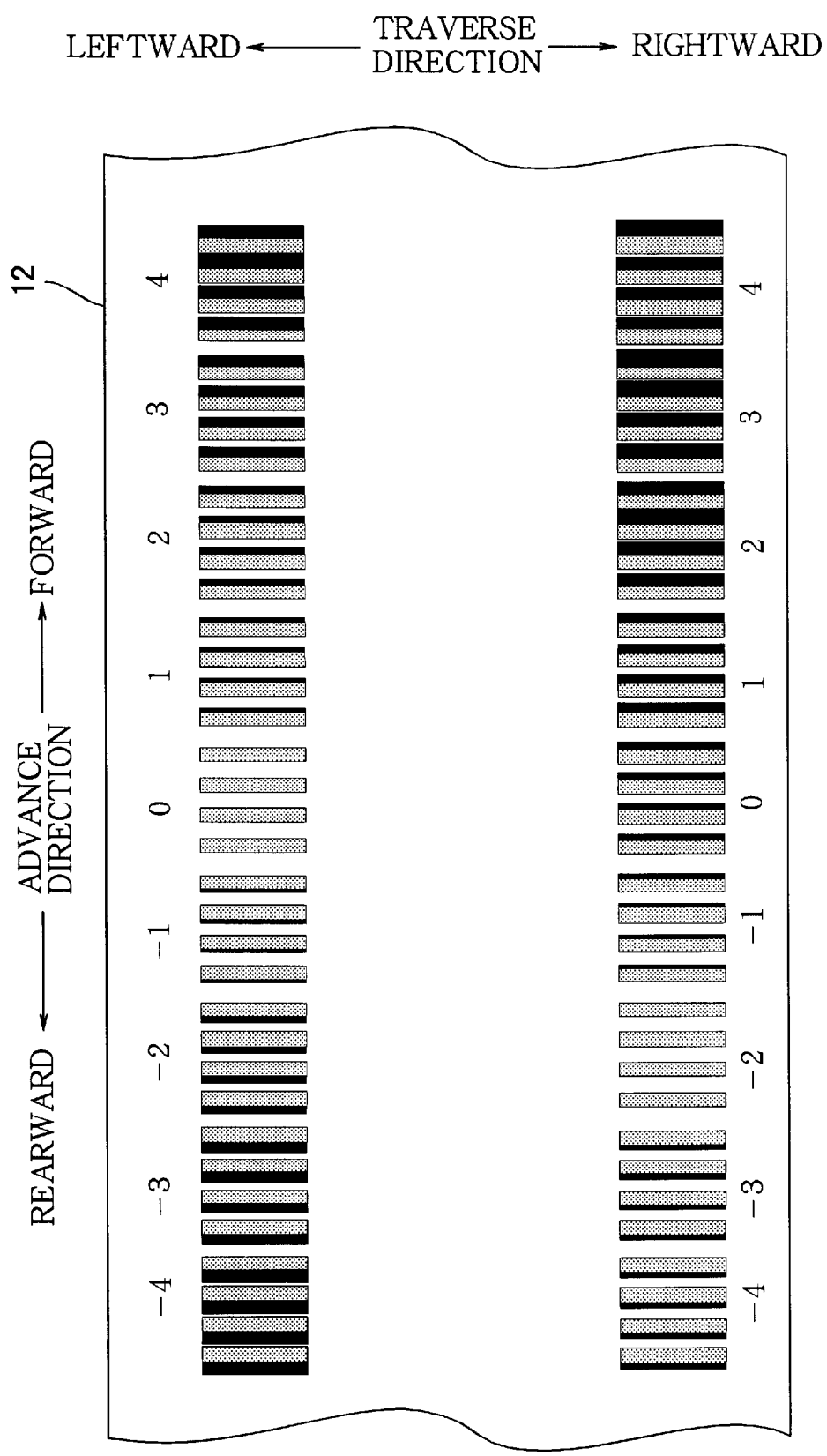
FIG. 11 illustrates the entire detection pattern for detecting color shift in the oblique direction.

FIG. 11 illustrates the entire detection pattern for detecting color shift in the oblique direction.

This color shift detection is featured in that the detection pattern of FIGS. 8A and 8B is printed at opposing end portions of the carrier belt 12 in the traverse direction. As described later, a difference between a color shift at the left end of the carrier belt 12 and a color shift at the right end is detected. On the basis of the difference, positional errors of the print engines 2Y, 2M, and 2C relative to the black print engine 2K may be detected.

FIG. 11 assumes that the yellow pattern is to be printed in superposition to the black detection pattern. For the left end of the carrier belt 12, the fifth block is a block in which the black pattern and the yellow pattern are printed with maximum overlap. For the right end of the carrier belt 12, the seventh block is a block in which the black pattern and the yellow pattern are printed with maximum overlap. The detection of a blocking which the black pattern and color pattern are printed one over the other with maximum overlap will be described later. It is to be noted that the yellow pattern is printed two dots rearward with respect to the target position. This amount of color shift and its direction is due to the combination of the rotational direction of the photoconductive drum with respect to the LED head and the mechanical misregistration of the LED head relative to the photoconductive drum. From the patterns in FIG. 11, it is determined that the yellow print engine 2Y is shifted relative to the block print engine 2K such that the right end of the LED head 3Y is shifted with respect to the left end by two dots forward in the advance direction. The same color shift also occurs if the photoconductive drum of the yellow print engine 2Y is obliquely mounted with respect to the traverse direction.

Detecting errors in print position in the oblique direction not only allows easy determining of color shift in the oblique direction but also enables determining of an average amount of color shift in the advance direction by merely calculating an amount of color shift in the advance direction at the left and right end portions of the carrier belt 12. This implies that the detection pattern for detecting color shift in the advance direction, printed on the left and right end portions of the carrier belt 12, can also be used to correct errors in print position both in the oblique direction and in the advance direction.

In the first embodiment, two reflection detectors 24R and 24L are used to detect errors in print position in the oblique direction. The reflection detectors 24R and 24L can also be used to read the detection pattern shown in FIG. 5 or FIG. 7, thereby allowing detection of errors in print position in the traverse direction and advance direction.

{Print Controlling Operation}

The print controlling operation of the first embodiment will be described with reference to FIGS. 1–11. A normal printing operation, i.e., charging, developing, transferring, and fixing operations will first be described.

Referring to FIG. 4 or FIG. 10, image data is received from, for example, a host computer through the host interface 50. Upon receiving the image data, the command/image processing section 51 sends a command to the mechanism controller 53 to print the image data. In response to the command, the mechanism controller 53 generates a signal to heat up the heater 55. The command/image processing section 51 stores the image data for one page of paper S, the image data for the respective color being separately stored. Then, the command/image processing section 51 begins to print as soon as the heater 55 reaches a predetermined temperature. The mechanism controller 53 sends a print command to the paper feeding mechanism, so that the paper S accommodated in the paper cassette 19 is fed to the print engines.

The normal print operation will be briefly described with reference to FIGS. 1 and 4.

The mechanism controller 53 drives the belt motor and drum motor, thereby driving the photoconductive drums 6, charging roller 5, developing roller 7, sponge roller 9, transfer roller 4, drive roller 13, and carrier belt 12, all of which are incorporated in the respective print engines 2K, 2Y, 2M, and 2C. Then, the mechanism controller 53 drives the hopping motor to drive the hopping roller 16 into rotation. The hopping roller 16 rotates to feed one page of the paper S from the paper cassette 19 to the guide 20. When the leading end of the paper S reaches between the registry roller 17 and the pinch roller 18, the hopping motor stops rotating.

The registry roller 17 and heat roller 25 are then rotated, and at the same time, the mechanism controller 53 turns on an attraction power supply in order to supply a voltage to the attraction roller 15. When the registry roller 17 feeds the print paper S between the attraction roller 15 and the carrier belt 12, the leading end of the paper S is attracted to the carrier belt 12 by the Coulomb force of the attraction roller 15 and the driven roller 14. The registry roller 17 further rotates so that the print paper S is transported in the advance direction shown by arrow E while being attracted to the carrier belt 12.

The mechanism controller 53 sends a command to the high voltage controller 56. In response to the command, the high voltage controller 56 turns on the charging power supply and the developing bias power supply so as to supply high voltages to the charging rollers and developing rollers of the respective print engines 2k, 2Y, 2M, and 2C. Thus, the surfaces of photoconductive drums 6 of the respective print engines are uniformly charged by the charging rollers 5, and the developing rollers 7 of the respective print engines receive predetermined high voltage.

The mechanism controller 53 detects when the print paper S reaches a predetermined location, and reports to the command/image processing section 51, which in turn reads the black image data for one line from the memory and sends it to the LED head interface 52. The LED head interface 52 converts the received image data into a data format that can directly drive the LED head 3K, and transmits the converted data to the LED head 3K. The LED head 3K energizes LEDs corresponding to the dots in the image data received from the LED head interface 52, thereby forming an electrostatic latent image in accordance with the received black image.

In this manner, the black image data is formed line-by-line into an electrostatic latent image on the surface of the photoconductive drum 6K until the black image for one page of the print paper S has been formed into an electrostatic latent image. The developing roller 7K applies toner to the electrostatic latent image formed on the photoconductive drum 6K. In this manner, the electrostatic latent image is developed line-by-line as the photoconductive drum 6K rotates. When the leading end of the paper S reaches between the photoconductive drum 6K and transfer roller 4K, the mechanism controller 53 generates a command to cause the TR generator 59 to turn on the transfer power supply for the black image. As the transfer roller 4K rotates, the toner image on the photoconductive drum is transferred line by line onto the print paper S until the black image for one page of the print paper S has been transferred. Then, the transfer operation of the black image is completed.

When the trailing end of the paper S reaches between the photoconductive drum 6K and the transfer roller 4K, the mechanism controller 53 sends a command to the high voltage controller 56 to turn off the transfer power supply for the print engine 2K. When the leading end of the paper S that has passed the print engine 2K reaches the next print engine 2Y located downstream of the print engine 2K, the print engine 2Y starts to transfer the yellow toner image to the paper S. That is, just as in the transfer operation of the black image, the command/image processing section 51 provides the yellow image data to the print engine 2Y, so that the electrostatic latent image of yellow image is formed on the photoconductive drum. Then, the yellow toner image is transferred to the paper S. Then, the paper is transported to the next print engine 2M and then to the print engine 2C, in sequence.

In this manner, toner images of the respective colors have been transferred onto the paper S, and the paper S is separated from the carrier belt 12 and advanced to the fixing section. The paper S passes between the heat roller 25 and the pressure roller 26 in pressure contact with the heat roller 25, the heat roller 25 having been heated to a predetermined temperature. After fixing, the paper is discharged to the paper stacker 28. When the sensor 27 detects the leading end of the paper S and reports to the mechanism controller 53, the mechanism controller 53 stops all of the motors 54. The transfer power supply is turned off when the print engines 2K, 2Y, 2M, and 2C has completed the transfer operations of the respective toner images. The charging power supply and developing bias power supply are turned off when the photoconductive drums stop rotating.

With a color image recording apparatus, the paper S fed by the paper feeding mechanism 19 is passed through all the print engines one after another so that images of four colors are printed by print engines 2K, 2Y, 2M, and 2C on the paper S. This way of printing lends itself to high speed printing. However, as described above, color shift may occur due to machining errors of, for example, the image drum unit, and mounting errors of the recording heads to the printer body, causing the shades of color of the image and distortion of printed characters. In order to solve such problems, the correction of print position is performed in the first embodiment.

{Operation of Detecting Color Shift}

The operation of detecting color shift by the use of a detection pattern will be described.

Figure 12:
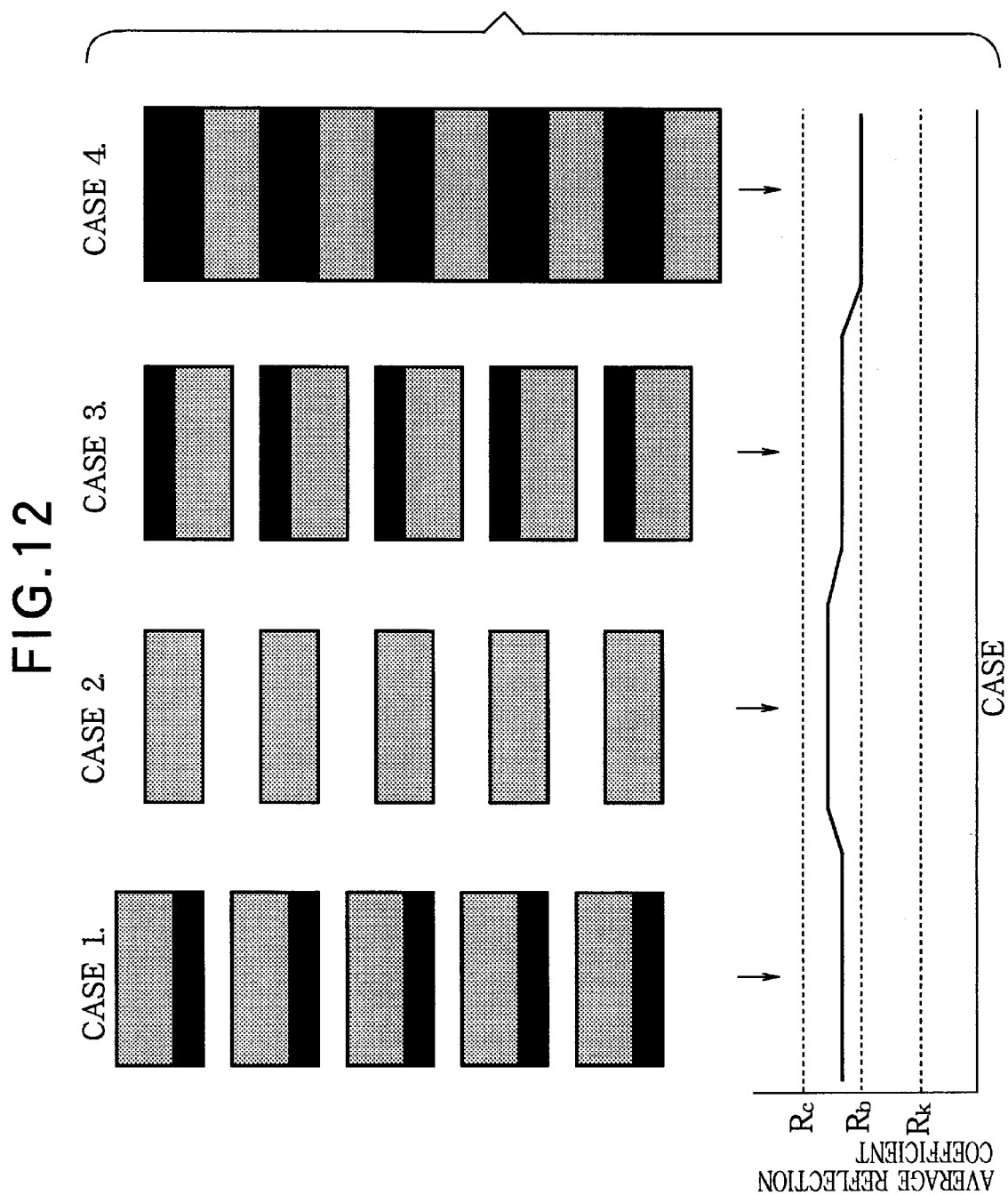
FIG. 12 illustrates the relationship between various degrees of overlapping of the detection patterns printed on the carrier belt, and corresponding average reflection coefficients.

FIG. 12 illustrates the relationship between various degrees of overlapping of the detection patterns printed on the carrier belt, and corresponding average reflection coefficients. Referring to FIG. 12, CASE 1 to CASE 4 illustrate four different print results in which the stripes of color detection pattern are printed on the stripes of the black detection pattern in four different ways according to the amount of color shift. The graph of FIG. 12 shows reflection coefficient (changes in density) or brightness of the detection pattern detected by the reflection detector 24. The graph assumes that Rc>Rb>Rk where Rc is the reflection coefficient of the color toner, Rb is the reflection coefficient of the carrier belt 12, and Rk is the reflection coefficient of the black toner. FIG. 12 plots position of the reflection detector 24 relative to the carrier belt 12 as the abscissa and average of measured reflection coefficient (i.e., density of image) as the ordinate. The reflection coefficient or density of image is detected by the reflection detector 24 or by the reflection detectors 24R and 24L of FIGS. 2 and 3, positioned with respect to the carrier belt 12.

Non-printed areas on the carrier belt 12 vary from block to block. As described previously, determining the position of a block in which the color detection pattern and black detection pattern are in most accurate registration (e.g., CASE 2) allows detecting of an amount of color shift in the traverse, advance, and oblique directions. Such a block can be identified by measuring the intensities of light reflected back by the blocks printed on the carrier belt 12 and then comparing the measured intensities as shown in FIG. 12E. From this comparison, an amount of color shift can be determined.

FIG. 13 illustrates degree of overlap of the black detection pattern and color detection pattern versus intensity of light reflected back by the printed pattern.

Referring to FIG. 13, if there is a difference between the reflection coefficient Rb of the carrier belt 12 and the reflection coefficient Rk of the black toner, the average reflection coefficient changes from block to block. The intensity of reflected light depends on the degree of overlap of the black detection pattern and the color detection pattern.

The average reflection coefficient R of the respective blocks is given by the following equation.

$$R=(\alpha Rc+\beta Rk+\gamma Rb)/(\alpha+\beta+\gamma)$$

where $\alpha$ is the number of dots indicative of a width of a color stripe, $\beta$ is the number of dots indicative of a width of an exposed black stripe, and $\gamma$ is the number of dots indicative of a width of the exposed surface of the carrier belt 12.

For example, for the pattern of FIGS. 7 and 8, $\alpha$ is 5 and $\beta+\gamma$ is 5. Thus, an average reflection coefficient of the detection pattern is calculated by $R=(1/10) \{(Rk-Rb)\beta+5Rc+5Rb\}$.

The reflection coefficient Rk of black toner is usually very low. If the carrier belt 12 has a relatively high reflection coefficient, then (Rk−Rb)<0. Therefore, if $\beta$ becomes larger, then the average reflection coefficient R becomes smaller. Thus, a s show n in FIG. 12, if the carrier belt 12 has a higher reflection coefficient than the black toner, the average reflection coefficient becomes the highest at a block in which two patterns overlap each other with a maximum overlap. Measuring an average intensity of light reflected back by the respective blocks allows detecting of color shift of a print engine with respect to a reference print engine (e.g., black print engine).

{Correction of Print Density}

In order to measure an average intensity of light reflected by the blocks printed on the carrier belt 12, the detection pattern should be printed with an optimum toner density. Thus, the correction of print density will be described.

Figure 16:
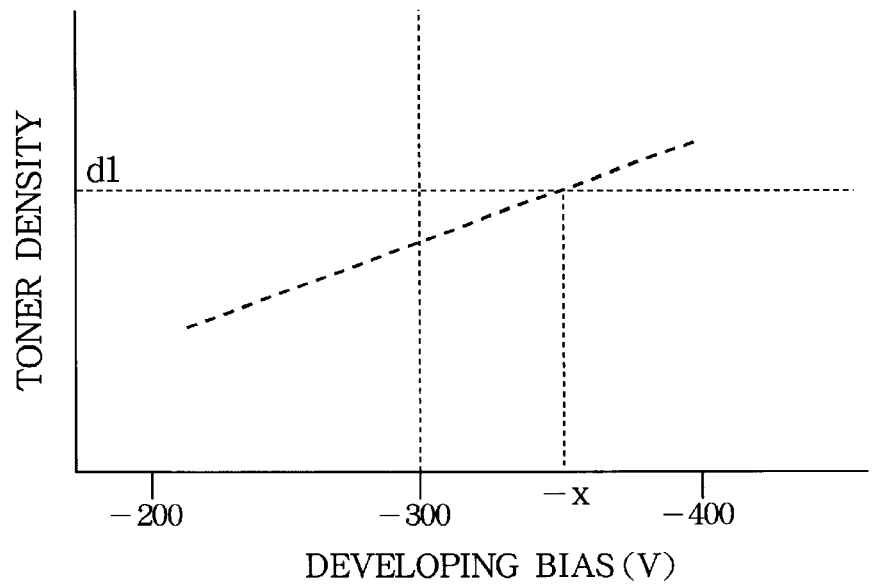
FIG. 16 illustrates the relationship between the toner density and developing bias voltage.

FIG. 16 illustrates the relationship between the toner density and developing bias voltage. FIG. 16 plots developing bias voltage as the abscissa and toner density as the ordinate.

For correcting the print density, a toner-density correcting pattern is transferred to the carrier belt 12 at the respective print engines. In order to accurately measure the toner density, the toner-density correcting pattern should be sufficiently large compared to the sensor spot. The toner-density correcting pattern may be in the form of a coarse adjustment pattern, which will be described later in a third embodiment. A detected toner density is compared with a predetermined toner density or target density (a predetermined level d1) in order to correct the developing bias voltage. As shown in FIG. 16, the toner density is proportional to the developing bias voltage. Therefore, if the detected toner density is less than the predetermined level d1, correction should be made such that the absolute value of the developing bias voltage becomes larger.

Toner density becomes lower as the absolute value of the developing bias voltage becomes lower. According to FIG. 16, if the developing bias voltage is −300V before correction, then correction should be made such that developing bias voltage after corrected satisfies the relationship of $|-300|<|-X|$.

{Operation of Correcting Print Position}

The operation of correcting print position in accordance with color shift will be specifically described.

First, a correction procedure will be described with respect to a case in which the color shift of yellow image relative to the black image in the traverse direction is eliminated.

The carrier belt 12 is driven to run with no paper fed and the print engine 2K prints the black detection pattern in the traverse direction. Then, the print engine 2Y prints the yellow pattern over the black detection pattern. As a result, a detection pattern as shown in FIG. 6 is printed on the carrier belt 12 and is advanced to the reflection detector 24. The reflection detector 24 generates an electrical signal indicative of print density in accordance with the light reflected back by the detection pattern printed on the carrier belt 12, the reflected light representing the reflection coefficient of the respective block. The reflection detector 24 provides the electrical signal to the mechanism controller 53. The memory in the mechanism controller 53 stores an amount of color shift of the yellow pattern with respect to the black detection pattern in terms of the position of block at which the output of the reflection detector is the highest.

After the amount of color shift for the yellow pattern has been measured, the detection patterns printed on the carrier belt 12 is scratched off with the cleaning mechanism formed of the tension roller 31 and cleaning blade 32 shown in FIG. 1.

Likewise, the corrections of color shift of the magenta and cyan images with respect to the black image in the traverse direction are also performed, and the amounts of color shift of the magenta and cyan images are stored.

The errors in print position of the respective print engines in the traverse direction are then corrected in the following manner, based on the detected amounts of color shift of the respective color images.

The print position in the traverse direction can be corrected by outputting the image data to the LED head 3K at earlier or later timings relative to the data transfer clock. For example, if the print position of the yellow image deviates from the black image by one dot rightward in the traverse direction, the mechanism controller 53 sends a position error signal to the LED head interface 52. The LED head interface 52 outputs the yellow image data to the print engine 2K earlier than the data transfer clock, thereby shifting the print position of the yellow image leftward by one dot.

Likewise, correction of print position can be performed for images of other colors with respect to the print position of the black image, thereby eliminating color shift. In this manner, the print position for the images of all colors in the traverse direction are corrected, thereby allowing printing of the respective images in the traverse direction without color shift.

Correction of print position in the advance direction can also be performed by using a detection pattern to detect an amount of color shift in the advance direction. If the print position of the yellow image deviates from the black image by three dots rearward in the advance direction, the mechanism controller 53 sends a position error signal to the LED head interface 52. The LED head interface 52 shifts the address of the yellow image data stored in the command/image processing section 51 by three dots forward, thereby outputting the yellow image whose print position has been corrected by three dots. Likewise, the print positions of images of all colors in the advance direction are corrected, thereby achieving a printing operation in the traverse direction without color shift.

Likewise, the print positions for yellow, magenta, and cyan images in the oblique direction are corrected by using the detection patterns printed on the left and right end portions on the carrier belt 12. If the yellow image deviates from the black image upper rightward by two dots, the mechanism controller 53 sends a position error signal indicative of the upper rightward deviation to the LED head interface 52. The LED head interface 52 shifts the address of the yellow image data stored in the command/image processing section 51, thereby transferring the yellow image data whose color shift has been corrected. For example, the LED head 3 has a line of 312 bytes, the LED head interface 52 converts the first 104 bytes of the image data into line data one dot behind, the middle 104 bytes into line data without shift, and the last 104 bytes of the image data into line data one dot ahead.

The oblique positional deviations of the LED heads 2Y, 2M, and 2C with respect to the print position printed by the black LED head 2K are determined by using the reflection detectors 24L and 24R located on the left and right ends of the carrier belt 12. The thus determined oblique positional deviations can be used to correct the print positions of the images of the respective colors, thereby achieving a color shift-free print. In this case, the reflection detectors 24R and 24L may be used as both a density correction sensor and a color shift detector.

In the aforementioned detection of color shift in the traverse direction, stripes extending perpendicular to the traverse direction were used. Instead, the stripes in FIGS. 14A–14D may also be used which extend in directions at 45 degrees with respect to the traverse direction.

FIGS. 14A–14D illustrate detection patterns for detecting color shift in the traverse direction.

The black detection pattern includes stripes aligned with a 5-bit space therebetween, each of the stripes having a 4-bit width and extending obliquely. A total of 11 blocks of the black detection pattern are printed in the advance direction and the color detection pattern are printed on the black detection patterns. Each of the color detection patterns has 4-bit width stripes with a 4-bit space therebetween.

Figures 14A, 14B, 14C, 14D:
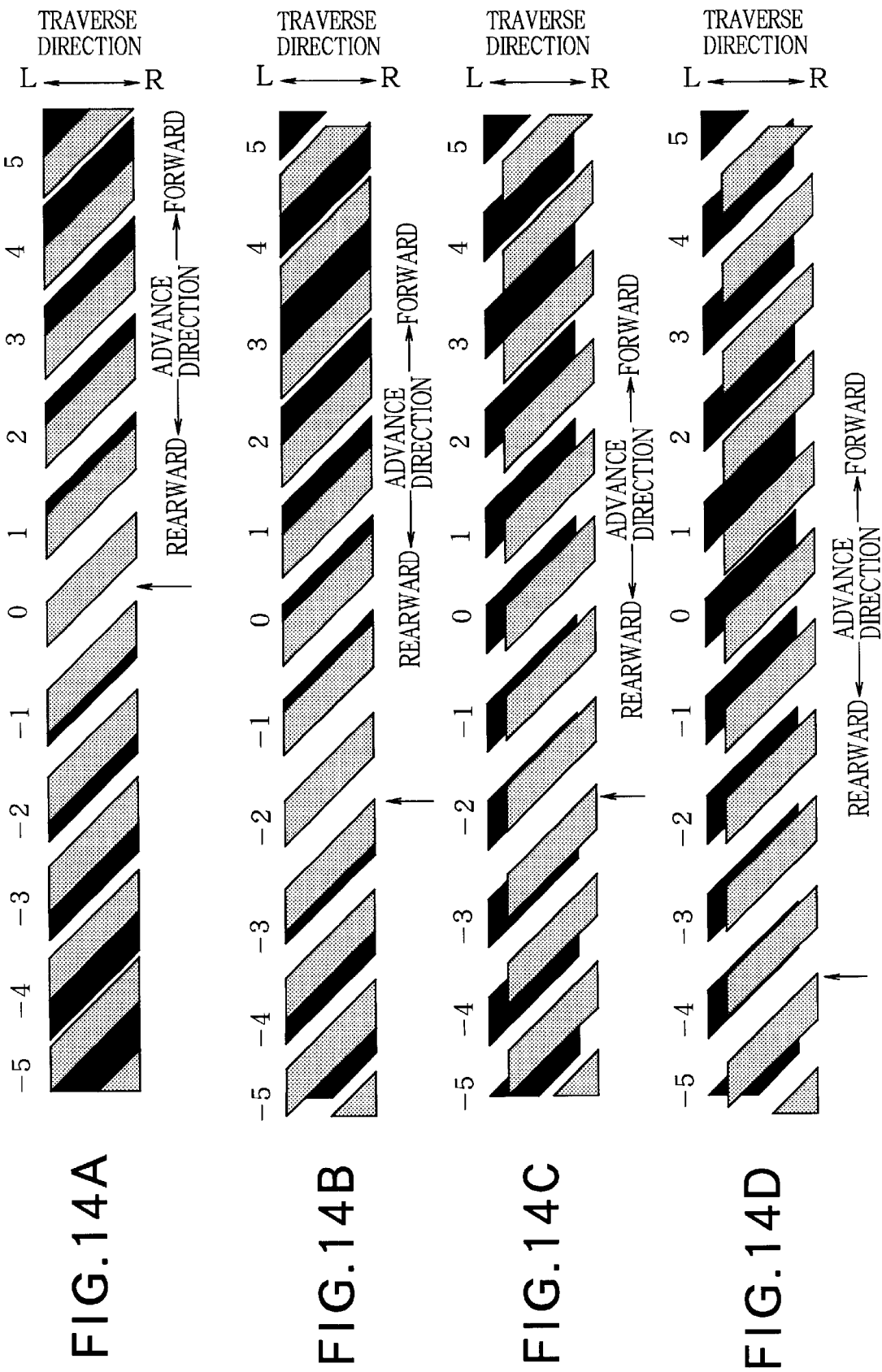
FIGS. 14A–14D illustrate detection patterns for detecting color shift in the traverse direction.

When the detection patterns of FIGS. 14A–14D are used, the detection signals contain the color shifts both in the traverse direction and in the advance direction. For this reason, the color shift in the advance direction is detected in advance by using the detection pattern of FIG. 7. In FIG. 14A, when no color shift is detected in the advance direction, if the black detection pattern and the color detection pattern are completely registered with each other at a block indicated by an arrow, then it is determined that no color shift has occurred in the traverse direction. In FIG. 14B, when the black detection pattern and color detection pattern are best registered with each other at a "–2" block, if the color detection pattern deviates from the black detection pattern by two dots rearward in the advance direction, then it is determined that no color shift has occurred in the traverse direction. Likewise, in FIG. 14C, when no color shift has occurred in the advance direction, the color detection patterns deviate by two dots rightward in the traverse direction. FIG. 14D illustrates when the color detection patterns deviate from the black detection pattern by two dots rearward in the advance direction, and two dots rightward in the traverse direction.

When detecting a large amount of color shift, the oblique stripe-like pattern of FIGS. 14A–14D is more suitable than that of FIG. 5. The stripes of the pattern of FIG. 5 (first embodiment) extend perpendicular to the traverse direction. Therefore, if a maximum amount of color shift in one direction that can be detected is to be increased, then the width of each stripe and the number of stripes need to be increased and the diameter of the light spot emitted from the reflection detector 24 needs to be increased accordingly. In contrast to this, the oblique stripe-like pattern of FIGS. 14A–14D ensures that the degree of overlap of patterns can reliably be detected without increasing the diameter of the light spot of the reflection detector even if the width of the stripes is increased from the four-dot width to, for example, a ten-dot width.

Figure 15A:
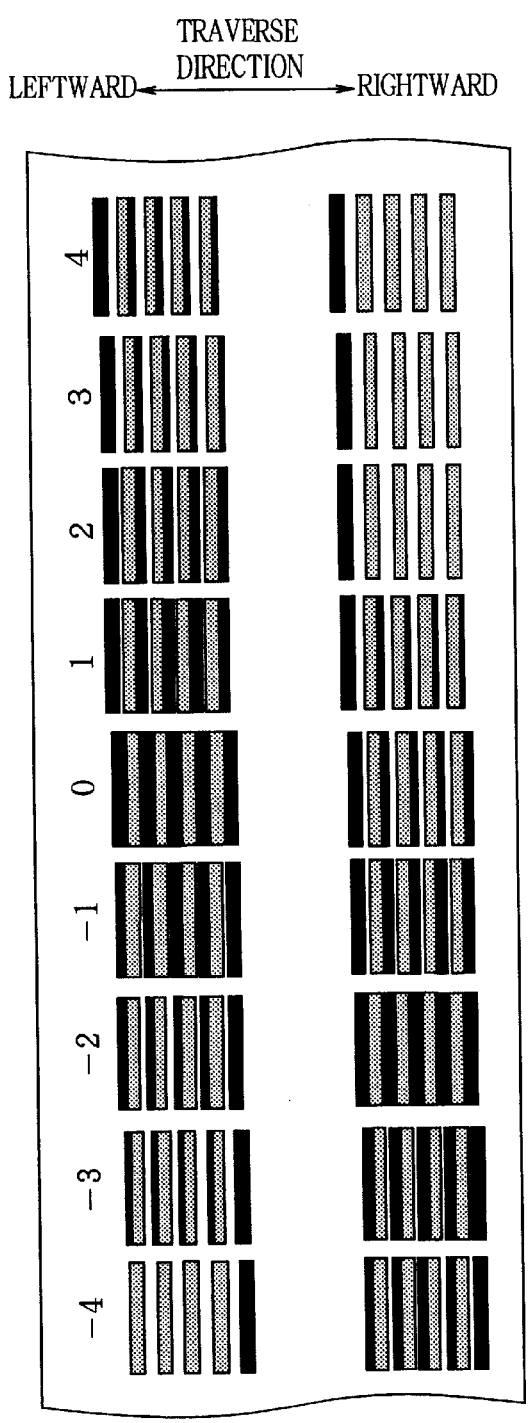
FIG. 15A illustrates a detection pattern for detecting color shift in the traverse direction.
Figure 15B:
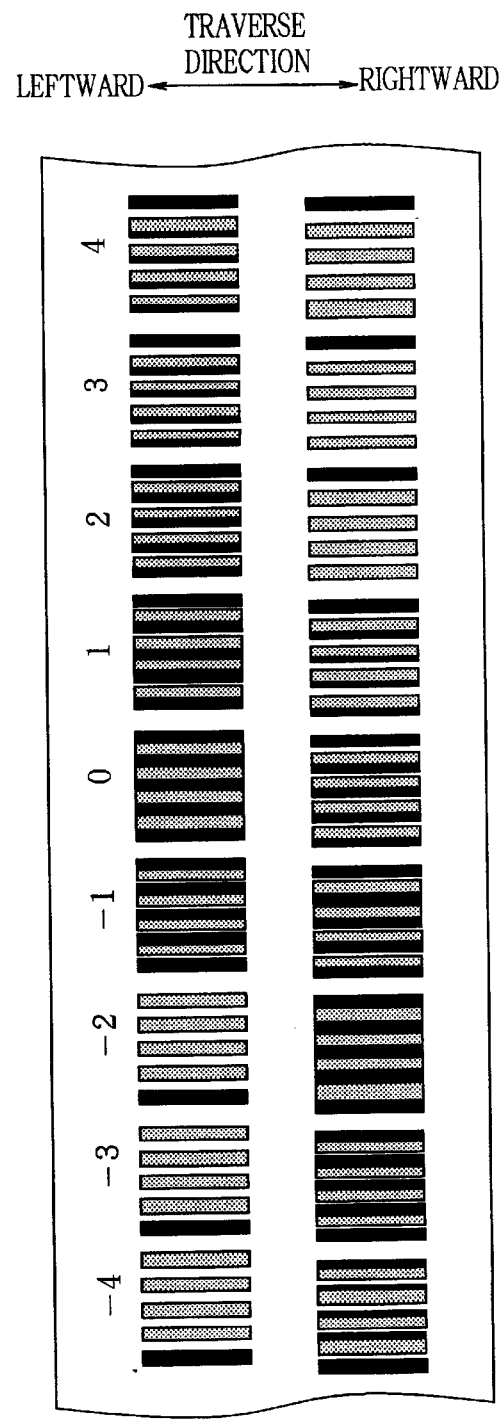
FIG. 15B illustrates a detection pattern for detecting color shift in the advance direction.

FIGS. 15A and 15B illustrate detection patterns designed for detecting a block in which an exposed area of the carrier belt 12 becomes minimum.

FIG. 15A illustrates a detection pattern for detecting color shift in the traverse direction.

FIG. 15B illustrates a detection pattern for detecting color shift in the advance direction.

In FIGS. 15A and 15B, if no color shift occurs, the "0" block has the black detection pattern and color detection pattern not overlapping each other, and the carrier belt 12 is not exposed at all. Since the black print engine 2K is located most upstream with respect to the advance direction, the black detection pattern is first printed and then one of the color detection patterns is printed on the black detection pattern.

Referring to FIG. 15A, the four stripes of the respective blocks of the color detection pattern are printed so that they are aligned exactly in line both in the advance direction and in the traverse direction. The black detection pattern are printed such that blocks downstream of the "0" block are shifted leftward in increments of a minimum number of bits by which color shift can be detected and blocks upstream of the "0" block are shifted rightward in increments of the minimum number of bits. Therefore, if the exposed area of the carrier belt 12 becomes minimum at the second block upstream of "0" block, then it can be determined that the color detection pattern deviates two dots rightward with respect to the black detection pattern.

Referring to FIG. 15B, the black detection pattern are printed such that blocks are shifted from the "0" block toward the downstream end of the black detection pattern in the advance direction in increments of minimum number of bits by which color shift can be detected, and are shifted from the "0" block toward the upstream end in increments of the minimum number of bits. For example, if the exposed area of the carrier belt 12 becomes minimum at the second block upstream of "0" block, then it can be determined that the color detection pattern deviates two dots upstream with respect to the black detection pattern.

For the patterns in FIGS. 15A and 15B, the color shift can be determined by identifying a block in which the exposed area of the carrier belt 12 is minimum and the intensity of light reflected back by the carrier belt 12 is minimum, providing that the reflection coefficient Rk of the black toner is smaller than that Rb of the carrier belt 12. Conversely, if the Rk is larger than Rb, the color shift can be determined by identifying a block in which the exposed area of the carrier belt 12 is minimum and the intensity of light reflected back by the carrier belt 12 is maximum.

The reflection coefficient Rk of the black toner is usually very small. Thus, the reflection coefficient Rk is usually smaller than that Rb of the carrier belt 12, so that the reflection coefficient of the detection pattern is minimum at a block in which the exposed area of the carrier belt 12 is minimum. Conversely, if the reflection coefficient Rk is larger than that Rb of the carrier belt, the reflection coefficient of the detection pattern is maximum at a block in which the exposed area of the carrier belt 12 is minimum. In any case, the reflection coefficient Rb of the carrier belt 12 is apt to vary from belt to belt, depending on the manufacturing process while the reflection coefficient of the black toner has little or no variation by the nature of black toner whose reflection coefficient is usually small. Thus, color shift may be more accurately determined through the use of a detection pattern designed such that a block having a minimum exposed area of the carrier belt is to be identified.

As described above, the maximum amount of color shift in one direction that can be practically detected depends on the number of dots aligned widthwise in a stripe, the distance between adjacent stripes, or the arrangement of the blocks in the advance and traverse directions. Moreover, the resolution or minimum amount of color shift that can practically be detected is determined by the specific arrangement of blocks in which the blocks are the shifted relative to one another along the direction in which the blocks are aligned. Thus, the detection pattern is not limited to those described above but may be modified as desired. The length of stripe may be changed. The number of stripes in a block may be changed. The overall size of the detection pattern may also be changed. Color shift may be determined by either identifying a block having a minimum reflection coefficient or identifying a block having a maximum reflection coefficient.

Second Embodiment

In the first embodiment, the detection patterns are printed on the carrier belt 12, and the reflection detector(s) measures the intensity of light reflected back by the detection patterns printed on the carrier belt 12, thereby determining color shift. However, the output of the reflection detector(s) 24 may not be uniform and causes errors in color shift measurement, if (1) the reflection detector is mounted at slightly different positions or angles with respect to the carrier belt, (2) the output of the reflection detector somewhat varies from detector to detector, and (3) the performance of reflection detector becomes deteriorated due to the fact that environmental changes and long-term use cause the soiling of the reflection detector. Usually, the reflection detector is calibrated against an object having a known reflection coefficient, thereby eliminating measurement errors due to variations of reflection detector and changes in the performance of reflection detector over time. However, installing such a reference object in the image recording apparatus increases the manufacturing cost.

A second embodiment is characterized in that in order to adjust the output of the reflection detector 24 to an optimum value, the mechanism controller 53 is provided with a calibration function. The overall construction of the apparatus, control circuits, and detection pattern are the same as those described in the first embodiment and therefore the description thereof is omitted.

Figure 17:
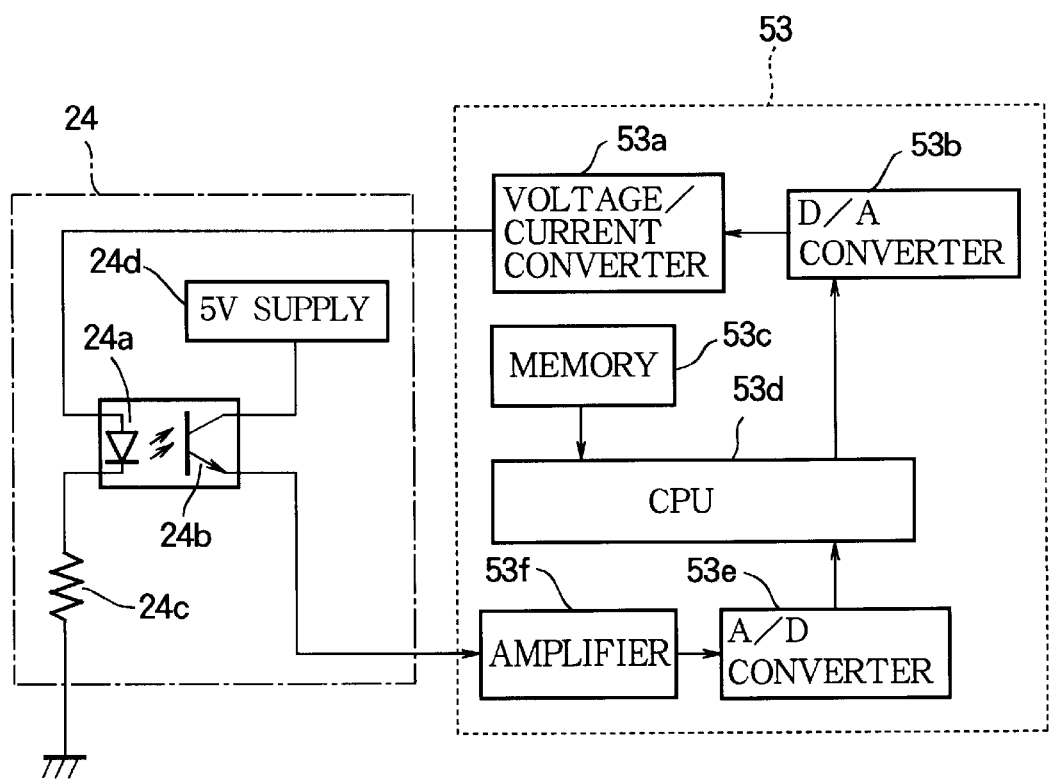
FIG. 17 is a block diagram showing the mechanism controller and the reflection detector.

FIG. 17 is a block diagram showing the mechanism controller and the reflection detector. Referring to FIG. 17, the reflection detector 24 is a sensor that includes a light emitting diode 24*a* and a phototransistor 24*b*. The intensity of the light emitted from the light emitting diode 24*a* may be adjusted by adjusting the current flowing there through. The phototransistor 24*b* generates an analog voltage proportional to the intensity of light reflected back by the carrier belt 12 and provides the analog voltage to the mechanism controller 53.

The anode of the light emitting diode 24*a* is connected to a voltage/current converter 53*a* that form a part of the mechanism controller 53. The cathode of the light emitting diode 24*a* is grounded via a resistor 24*c*. The collector of the phototransistor 24*b* is connected to a 5V-power supply 24*d*. The emitter of the phototransistor 24*b* functions as an output terminal and is connected to a signal amplifier 53*f*. The amount of light emitted from the light emitting diode 24*a* varies depending on the current flowing through the light emitting diode 24*a*.

The signal amplifier 53*f* is connected to an A/D converter 53*e*, which in turn is connected to a CPU 53*d*. The CPU 53*d* is connected to a D/A converter 53*b* and a memory 53*c*. The D/A converter 53*b* is connected to the voltage/current converter 53*a*. The maximum input voltage of the AD converter 53*e* is 5 V.

{Calibration of Reflection Detector}

A method of calibrating the output of the reflection detector will be described. The calibration is performed against a reference pattern printed on the carrier belt 12.

Figure 18:
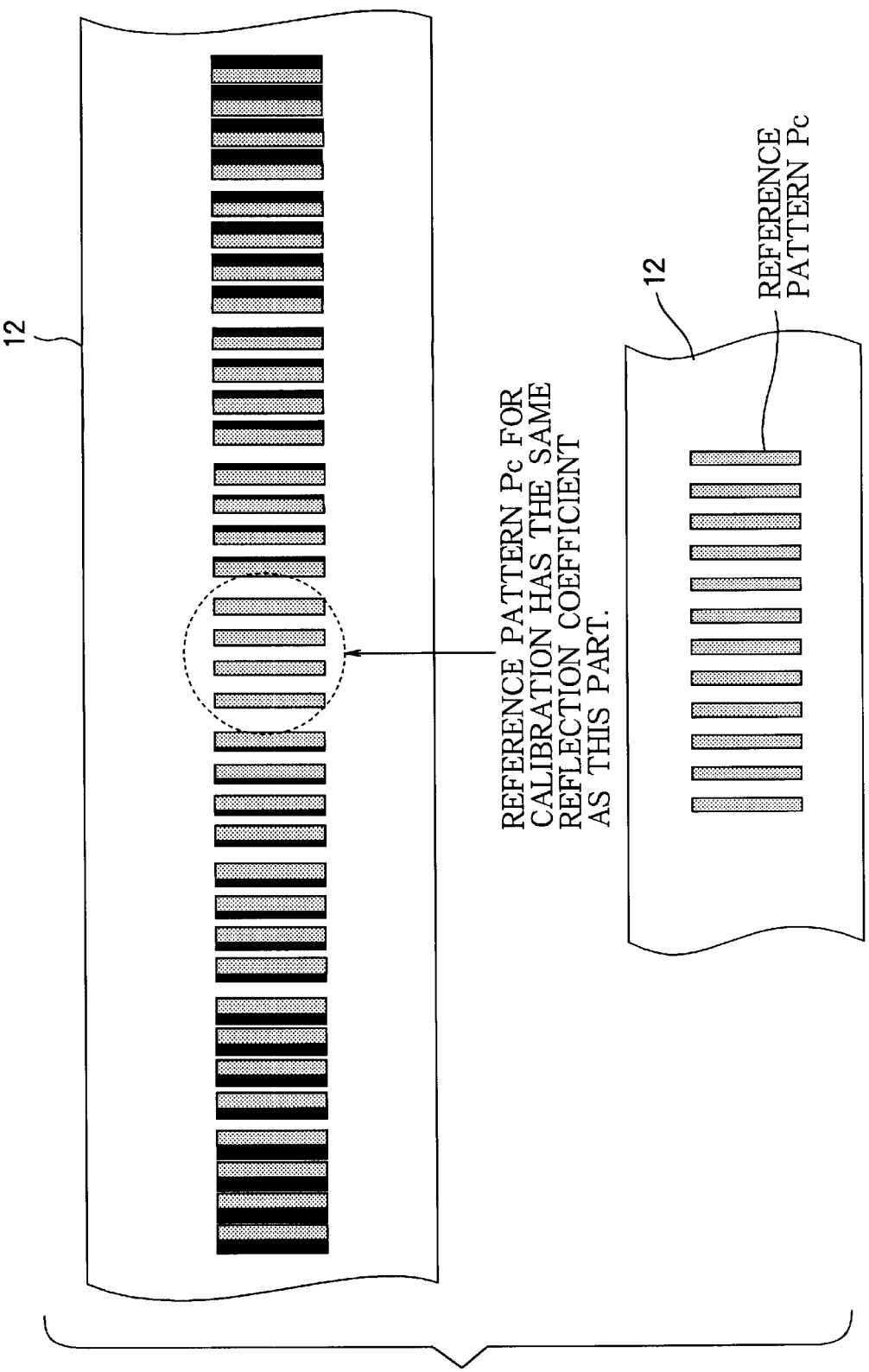
FIG. 18 illustrates an example of a reference pattern for calibration.

FIG. 18 illustrates an example of a reference pattern for calibration.

The reference pattern Pc of FIG. 18 is printed on the carrier belt 12 together with the detection pattern for detecting color shift in the advance direction. The black toner usually has a very low reflection coefficient. Thus, when the carrier belt 12 has a higher reflection coefficient than the black toner, if the reference pattern Pc has a reflection coefficient substantially the same as that of the color detection pattern alone, then it is easy to detect a block having the highest intensity of light reflected back by the carrier belt 12. In other words, a block in which two kinds of pattern are printed with a maximum overlap can be easily detected. Thus, as shown in FIG. 18, the specific reference pattern Pc may be of the same block configuration as the color detection pattern, which was described as a detection pattern for detecting color shift in the advance direction. The reference pattern may, of course, be a solidly shaded pattern having substantially the same reflection coefficient as the detection pattern.

In this manner, calibrating the output of the reflection detector against the reference pattern Pc facilitates detection of a block in which the patterns are most overlapped.

When the carrier belt 12 has a lower reflection coefficient than the black toner, an area of the carrier belt 12 completely covered with the blocks of the detection patterns has the highest reflection coefficient and a block having the lowest reflection coefficient is to be identified. In this case, the reference pattern Pc can be implemented by first printing a solid black background on the carrier belt 12 and then a pattern of a color on the black background such that the pattern of the color and black background cooperate to resemble the same proportions of printed areas as a detection pattern. The thus printed reference pattern has substantially the same reflection coefficient as a block in which the carrier belt 12 is completely covered, thereby enabling calibration of the reference detector 24.

Figure 19:
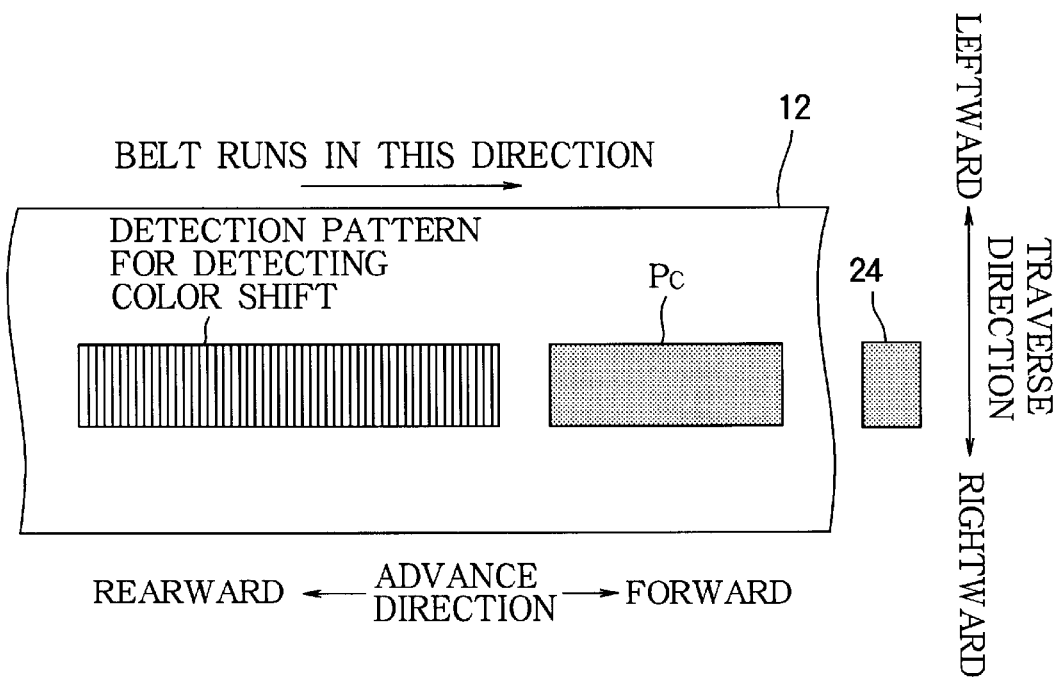
FIGS. 19 and 20 illustrate the positional relationship between the reference pattern for calibration and the detection pattern for detection of color shift.
Figure 20:
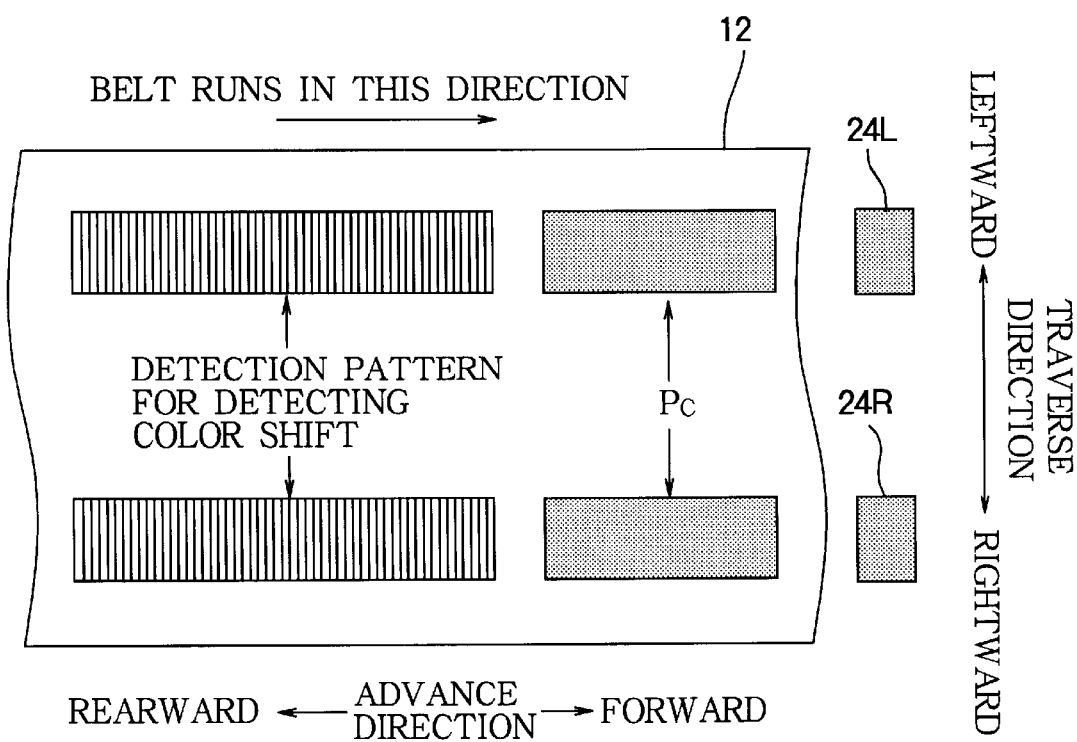

FIGS. 19 and 20 illustrate the positional relationship between the reference pattern for calibration and the detection pattern for detection of color shift.

As shown in FIGS. 19 and 20, the reference pattern Pc of FIG. 18 is printed upstream of the detection pattern used for detecting color shift in the advance direction. The mechanism controller 53 adjusts the light emission of the light emitting diode 24*a* so that when the reflection detector 24 is reading the reference pattern Pc, a maximum output of the signal amplifier 53*f* is about 4.5 V. The maximum output is adjusted to about 4.5 V so that the input to the A/D converter 53e does not exceed 5 V while at the same time the output is as high as possible within a range in which detection can be performed. It is also possible to assign a specific value to the output voltage of the reflection detector corresponding to a block in which two kinds of detection pattern are printed with a maximum overlap.

The calibration operation of the reflection detector, which detects the color shift between the two kinds of patterns, will be described. Here, the normal printing operations (charging, illuminating, developing, transferring, and fixing) and the detection and correction of color shift are the same as those in the first embodiment.

No current flows through the light emitting diode 24a until the carrier belt 12 on which the reference pattern Pc is printed reaches the reflection detector 24. When the reference pattern Pc advances to the phototransistor 24b of the reflection detector 24, the CPU 53d provides a digital signal to the D/A converter 53b so that the current through the light emitting diode 24a is the same as that stored in the memory 53c. The D/A converter 53b provides an analog voltage corresponding to the digital signal to the voltage/current converter 53a. The voltage/current converter 53a converts the analog voltage received from the A/D converter 53e into an analog current, which in turn flows through the light emitting diode 24a. The phototransistor 24b of the reflection detector 24 detects the light reflected back from the reference pattern Pc and generates an analog voltage proportional to the intensity of the light reflected back. The signal amplifier 53f amplifies the analog voltage and feeds the amplified analog voltage to the A/D converter 53e.

The output of the reflection detector 24 is converted into a digital signal and input to the CPU 53d, which in turn makes a decision to determine whether the converted voltage is higher than a target voltage stored therein. The target voltage is an optimum output voltage of the reflection detector 24, stored in the memory 53c. If the output voltage of the reflection detector is lower than the optimum voltage by a predetermined value, the current through the light emitting diode 24a is increased in the manner described above. If the output of the reflection detector 24 is higher than the optimum voltage by a predetermined value, the current through the light emitting diode 24a is decreased in smaller increments than when the current was increased, until the voltage is below the optimum voltage. This completes calibration.

Third Embodiment

In the first embodiment, the intensity of light reflected back from the detection patterns is used to eliminate the color shift that occurs in a color image recording apparatus incorporating a plurality of image forming sections. The first embodiment is capable of detecting color shift within four dots back and forth both in the traverse direction and in the advance direction. In order to detect and correct larger color shifts, a plurality of detection patterns should be prepared such that the detection patterns have different ranges of detection and different minimum amounts of color shift that can be detected. Then, using such a plurality of detection patterns, color shift is detected and corrected in a plurality of levels. Thus, data indicative of color shift needs to be derived not only from detection patterns for fine adjustment of print position (i.e., patterns described in the first and second embodiments) but also from detection patterns for coarse adjustment of print position.

In the third embodiment, a color shift is detected by using a detection pattern by which two-stage detection is performed, i.e., coarse detection (or low resolution) and fine detection (or high resolution). The coarse detection is performed using a coarse detection pattern so that the print position is corrected or adjusted in a coarse mode. Then, the fine detection is performed using a fine detection pattern so that the print position is corrected or adjusted in a fine mode. Further, a reading circuit for the two-stage detection will be described which detects color shift in the oblique direction. The overall construction of the apparatus and control circuits are the same as those described in the first embodiment and therefore the description thereof is omitted.

Figure 21:
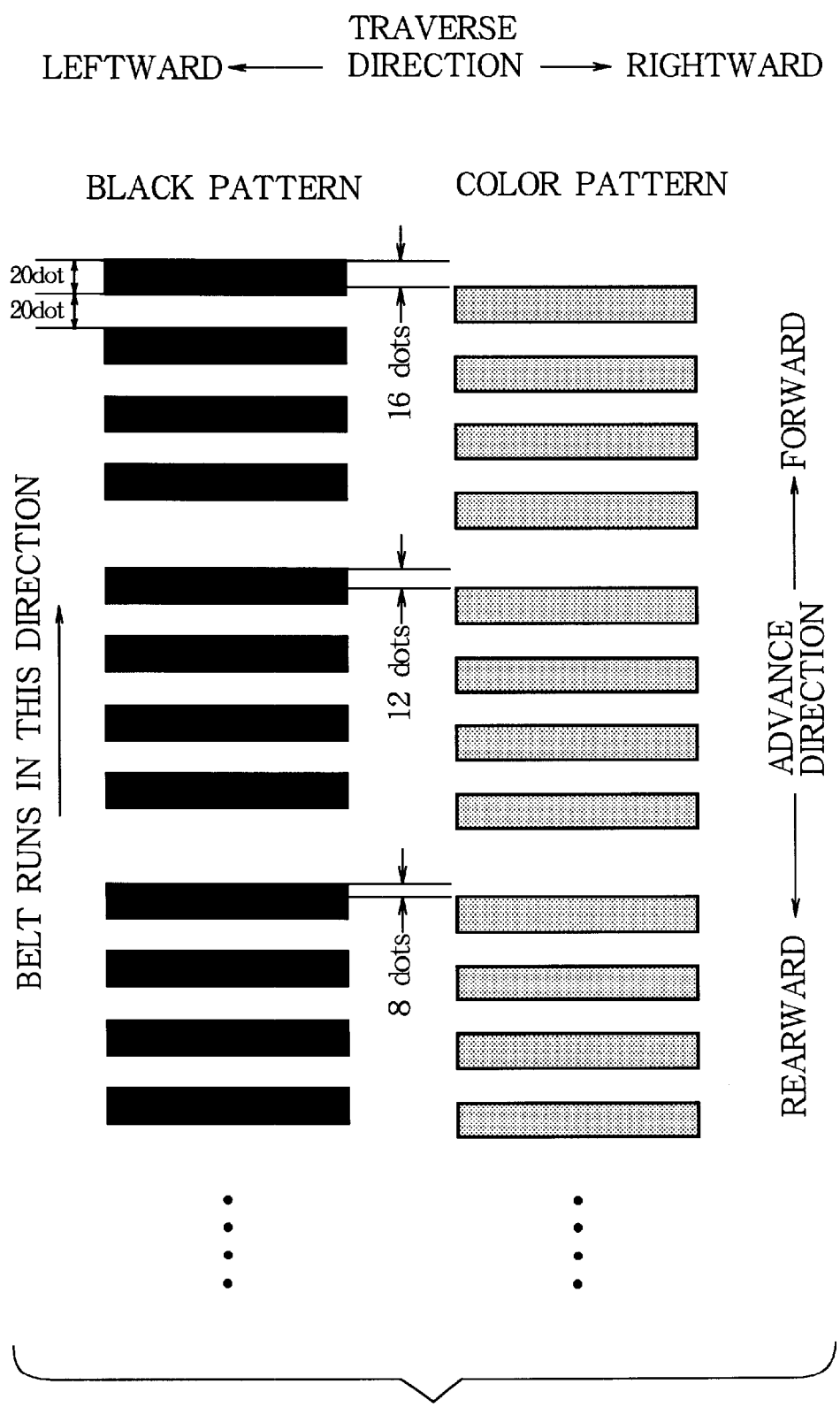
FIG. 21 illustrates a coarse detection pattern for detecting color shift in the advance direction.

FIG. 21 illustrates a coarse detection pattern for detecting color shift in the advance direction.

Referring to FIG. 21, the stripes of the coarse detection pattern have a 20 dot-width and are spaced apart by 20 dots. For the color detection pattern, the blocks are increasingly shifted in increments of 4 dots along the row of the blocks of the black detection pattern. In other words, the coarse detection pattern is four time as large as the fine detection pattern in the width of stripes, space between adjacent stripes, and the size of shift by which the blocks of the color detection pattern are shifted relative to those of the black detection pattern. In the third embodiment, while the stripe is also longer than the fine detection pattern, the length of stripe only requires to be longer than the diameter of the spot of light emitted from the light emitting diode 24a of the reflection detector 24.

FIGS. 22A and 22B illustrate two coarse detection patterns that detect different amounts of color shift in the advance direction.

Referring to FIG. 22B, for example, when the color detection pattern is printed such that the color patters deviates from the black detection pattern by 8 dots in the advance direction, the two patterns are overlapped completely each other at the second block from the middle block rearward in the advance direction. A color shift detected by using these two patterns still contains an error of ±2 dots even if a block having the highest average reflection coefficient is accurately detected. Even an error of ±4 dots may be encountered if a block having the second highest average reflection coefficient is erroneously detected as being a block having the highest average reflection coefficient. However, if the print position is first corrected by using the coarse detection pattern and then colorshift is detected by using the fine detection pattern just as in the first embodiment, a large amount of color shift (here within ±16 dots) may be corrected.

FIGS. 23A and 23B illustrate the relationships between the spot diameter of the light emitted from the light emitting diode 24a and the size of stripes of the detection pattern.

Figure 24:
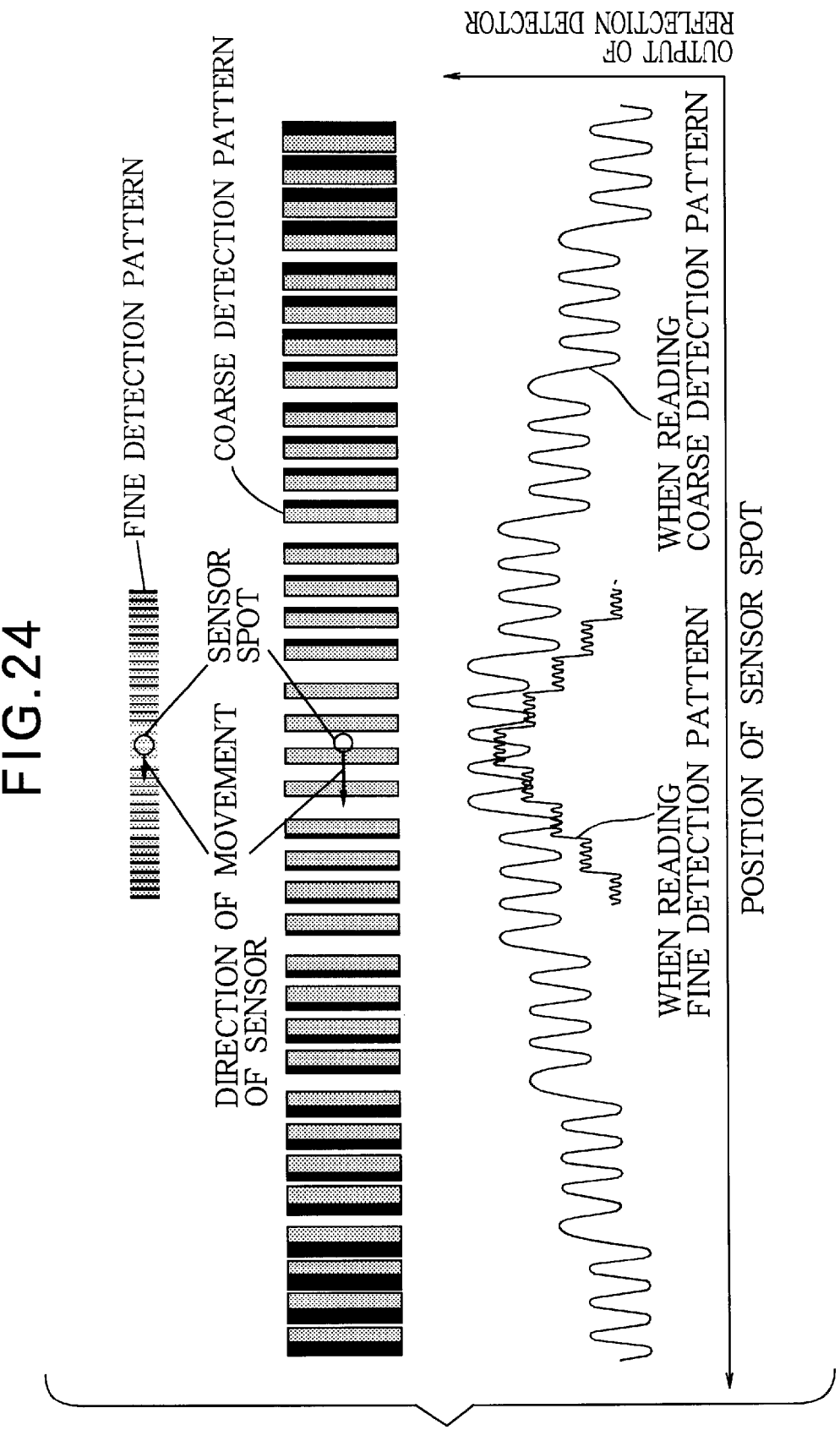
FIG. 24 illustrates waveforms of the outputs of the reflection detector 24 when the light spot scans the detection pattern.

FIG. 24 illustrates waveforms of the outputs of the reflection detector 24 when the light spot scans the detection pattern.

FIG. 23A is an enlarged view of a block of the fine detection pattern.

FIG. 23B is an enlarged view of a block of the coarse detection pattern.

The pattern of FIG. 23B is four times as large in the number of dots as that of FIG. 23A.

If the same reflection detector is used in reading the fine detection pattern and the coarse detection pattern, the outputs of the reflection detector contain drastically different frequency components because the detection beam of the same spot diameter is used to read stripes of different sizes. The fine detection pattern and the coarse detection pattern of FIGS. 23A and 23B have stripes aligned in the advance direction. Thus, as shown in FIG. 24, the detection beam traverses the stripes, thereby creating oscillatory waveforms with different frequency components for the fine detection pattern and the coarse detection pattern. Therefore, the sensor outputs for the fine detection pattern and the coarse detection pattern should be input into integration circuits having different time constants, respectively, and then fed into amplifiers, respectively, so that the output waveforms of the amplifiers contain envelopes representative of average sensor outputs for the respective blocks.

Figure 25A:
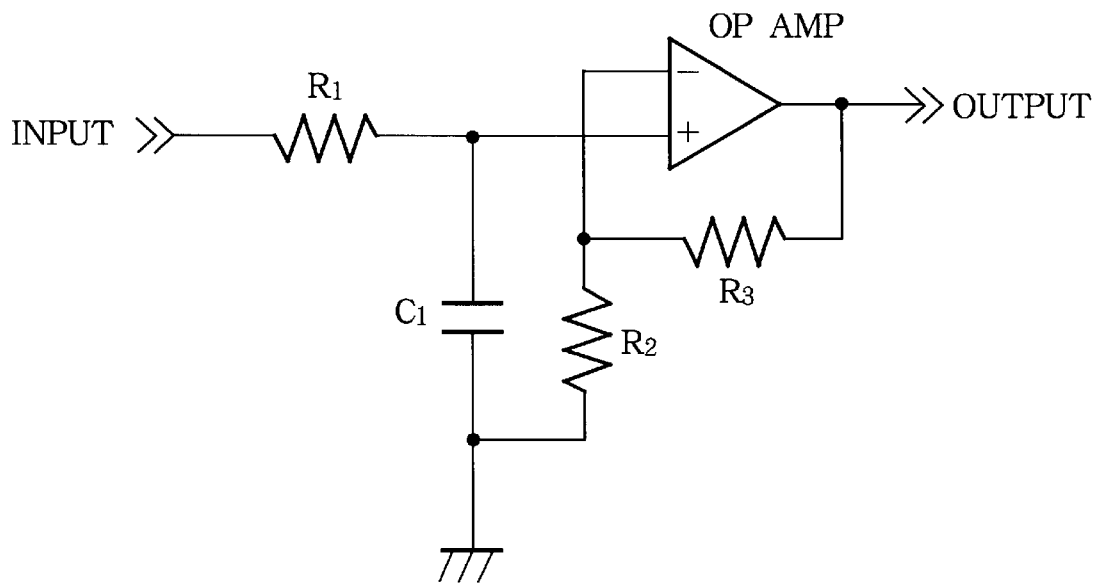
FIGS. 25A and 25B illustrate pattern-reading circuits for the coarse detection pattern and the fine detection pattern, respectively.
Figure 25B:
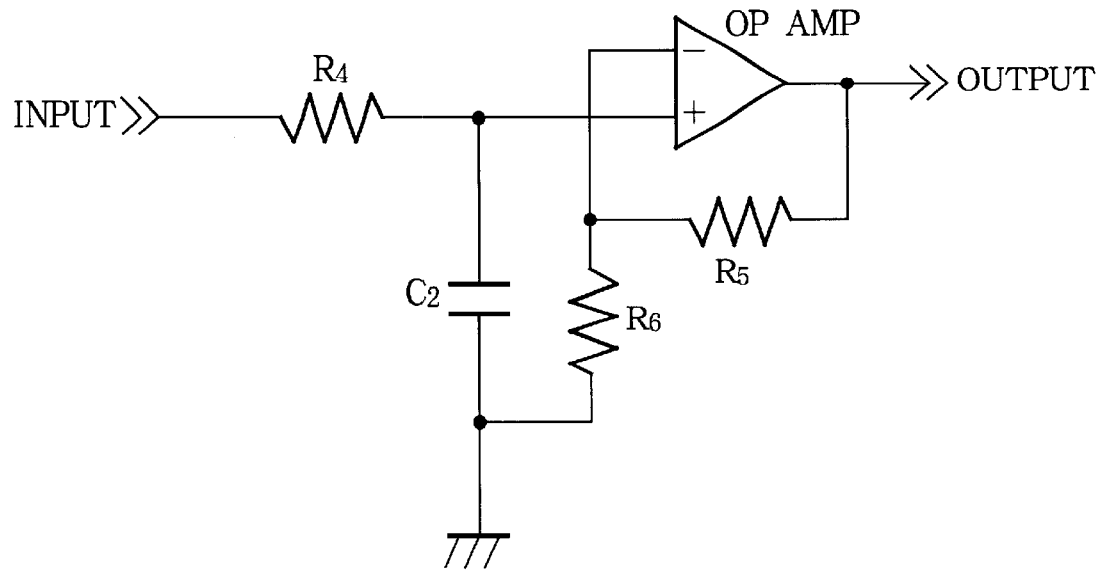

FIGS. 25A and 25B illustrate pattern-reading circuits for the coarse detection pattern and the fine detection pattern.

The circuit of FIG. 25A includes an integration circuit having a time constant C1R1 and the circuit FIG. 25B includes an integration circuit having a time constant C2R4. It is to be noted that C1R1>C2R4. In order to perform two-level detection of color shift (i.e., fine detection and coarse-adjustment detection), in the oblique direction, two types of reading circuits with different time constants are needed on each of the left and right end portions of the carrier belt 12. Thus, a total of four circuits are required.

FIG. 26A illustrates the detection pattern for detecting color shift in the multiple level (fine detection and coarse detection).

FIG. 26B illustrates the arrangement of the detection pattern according to the third embodiment.

In the third embodiment, the patterns for detecting color shift in the oblique direction are arranged such that the blocks of the pattern on the left end portion of the carrier belt 12 are staggered with respect to those of the pattern on the right end portion. In the third embodiment, the left reflection detector is selectively connected to the inputs of the two types of reading circuits on the left ends, and the right reflection detector is selectively connected to the inputs of the two types of reading circuits on the right ends.

Figure 27:
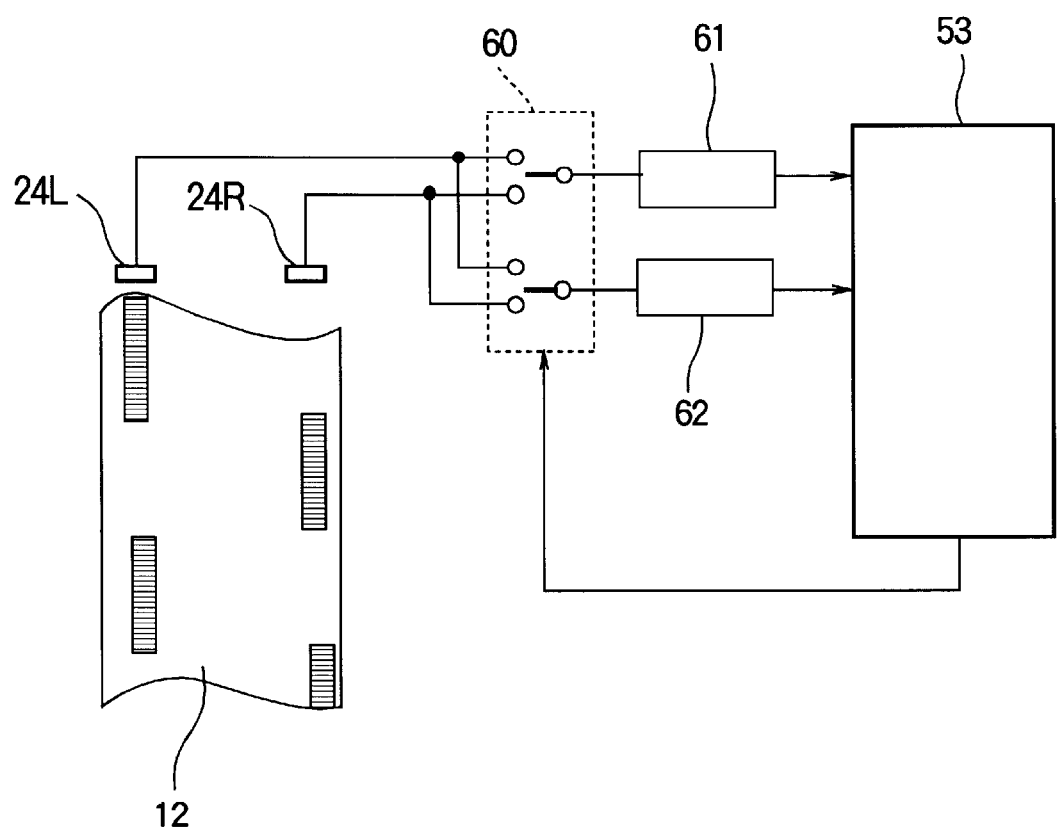
FIG. 27 is a block diagram illustrating the reading circuits of the third embodiment.

FIG. 27 is a block diagram illustrating the reading circuits of the third embodiment.

Referring to FIG. 27, the mechanism controller 53 controls the switch 60 to switch the outputs of the reflection detectors 24L and 24R so that the outputs are selectively directed to a reading circuit 61 for the fine detection pattern and to a reading circuit 62 for the coarse detection pattern. The reading circuits 61 and 62 then provide their outputs to the mechanism controller 53.

First, when the color shift correction operation is activated, each of the print engines 2K, 2Y, 2M, and 2C print a corresponding fine detection pattern and a coarse detection pattern alternately on the left and right end portions of the carrier belt 12 along the advance direction. As the carrier belt 12 runs, the coarse detection pattern of the yellow toner first passes the reflection detector 24L which scans the coarse detection pattern printed on the left end portion of the carrier belt 12. The switch 60 connects the output of the reflection detector 24L to the reading circuit 61, so that the color shift of yellow toner on the left end portion of the carrier belt 12 is detected. The measured color shift of yellow pattern is then stored in the memory, not shown, of the mechanism controller 53.

Immediately after the reflection detector 24L has read the coarse detection pattern (YL) printed by the yellow print engine 2Y, the mechanism controller 53 sends a command to the switch 60 to connect the reflection detector 24R to the reading circuit 61. Thus, the reflection detector 24R reads the yellow coarse detection pattern (YR), which is staggered on the right end portion of the carrier belt with respect to the left coarse detection pattern (YL). The measured color shift on the right end portion of the carrier belt 12 is then stored in the memory, not shown, of the mechanism controller 53.

Likewise, the color shift is detected for magenta detection pattern and cyan detection pattern. Then, print position in the oblique direction, described in the first embodiment, is corrected on the basis of the thus measured color shift of the respective colors on the left and right end portions of the carrier belt 12. The correction of print position of each color in the oblique direction can be performed immediately after the detection of color shift of that color. The print position for the yellow image may be performed while the magenta detection pattern is being read and the print position for the magenta image may be performed while the cyan detection pattern is being read. In this manner, the fine detection patterns can be printed as early as possible.

Then, the fine detection patterns of the respective colors, i.e., rearward half of the pattern of FIG. 26, are printed such that the blocks of the pattern on the left end portion are staggered with respect to those of the pattern on the right end portion. The printing of the fine detection pattern of a color may be initiated at any timing after the print position for that color has been corrected by using the coarse detection pattern. For example, the printing of, for example, the yellow fine detection pattern needs to be printed after the coarse adjustment of print position has been done for the yellow image. The corrections of print positions are performed in exactly the same way as the fine detection pattern and coarse detection pattern Fourth Embodiment According to the first embodiment, the detection pattern is printed on the carrier belt 12 and the reflection detector detects the intensity of light reflected back by the detection pattern, thereby correcting color shift that occurs among a plurality of image forming sections of corresponding colors. However, some of the color image recording apparatus have a plurality of printing speeds and operates at one of the plurality of printing speeds according to the types of recording medium. Color shift of different sizes occurs every time the printing speed is switched. Therefore, the correction of the print position is complex.

Figure 28:
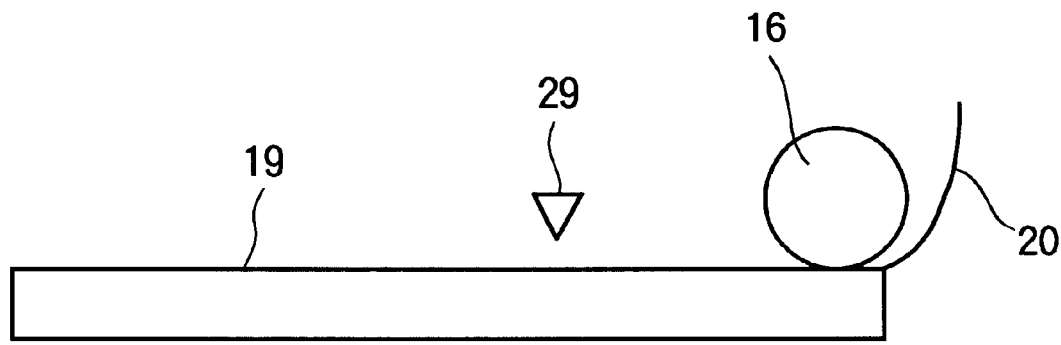
FIGS. 28 and 29 illustrate a medium identifying sensor according to a fourth embodiment.
Figure 29:
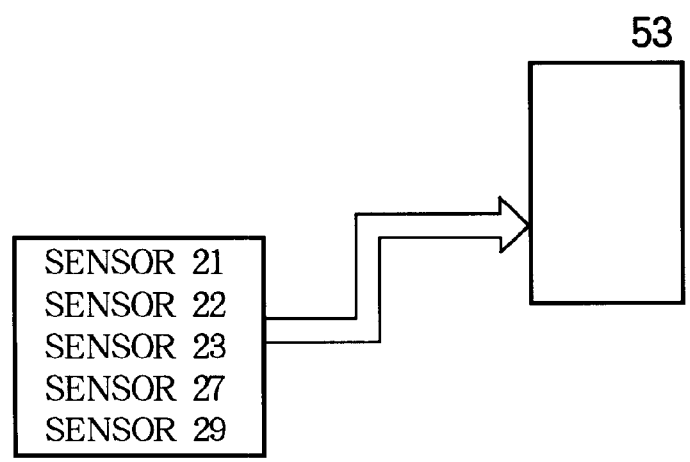

FIGS. 28 and 29 illustrate a medium identifying sensor 29 according to a fourth embodiment.

In the fourth embodiment, the image recording apparatus may be selectively set to one of a plurality of printing speeds according to the type and property of the recording medium. The image recording apparatus according to the fourth embodiment is basically of the same configuration as that of the first embodiment but has a medium identifying sensor 29 in proximity to the paper cassette 19. Moreover, the image recording apparatus includes an operation panel 30 connected to the mechanism controller 53 of FIG. 29. The user can manually set the type of the recording medium through the operational panel 30. The rest of the control circuit is the same as that of the first embodiment and the description thereof is omitted.

Figure 30:
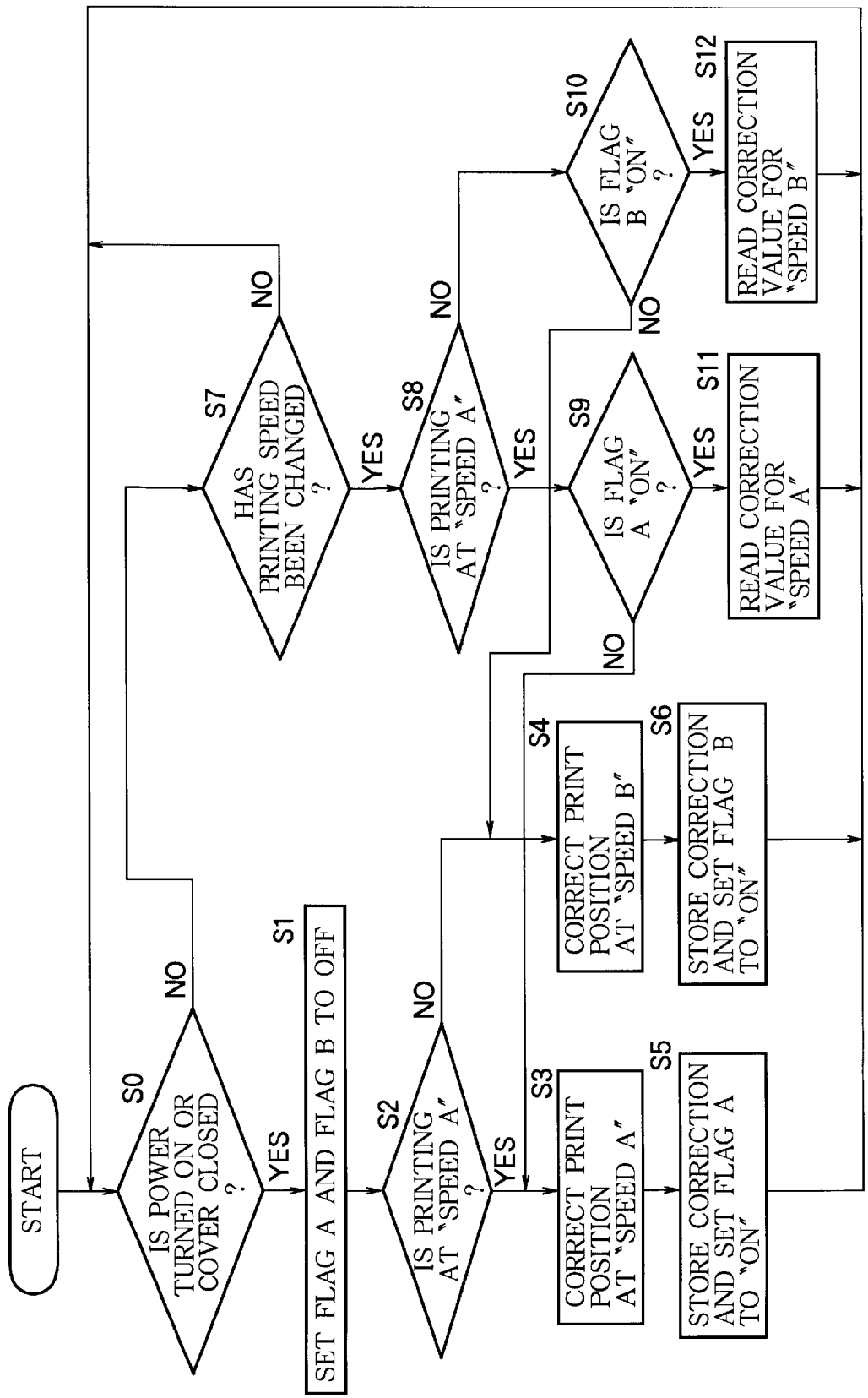
FIG. 30 is a flowchart illustrating the operation of the fourth embodiment.

FIG. 30 is a flowchart illustrating the operation of the fourth embodiment. The flowchart assumes that the image recording apparatus has two printing speeds, i.e., speed A and speed B, and the amounts of color shift corresponding to the two speeds have been stored.

At step S0, the mechanism controller 53 determines whether a cover of the apparatus has been closed or power is on. If the answer is YES at step S0, then the program proceeds to step S1 where the flag A and flag B are set to off. Then, the program proceeds to step S2 where a check is made to determine whether the present speed is speed A or speed B. Then, the amounts of color shift is detected for speed A (step S3) and speed B (step S4), and the detected sizes for color shift are stored into a memory, not shown, within the mechanism controller 53 and the corresponding flag A (step S5) or flag B (step S6) is set on.

Upon completion of correction, if the present printing speed is speed A, then flag A is set on. Then, the program returns to step S1 where the mechanism controller 53 again determines whether the cover is closed or the power is on. If the answer is NO at step S0, then a check is made at step S7 to determine whether the printing speed has been changed. If the answer is YES at step S7, then the program proceeds to step S8 where a check is made to determine whether the present printing speed is speed A or speed B. At steps S9 and S11, if the present printing speed is one indicated by the flag A, then the correction values for speed A are read out from the memory. At steps S10 and S12, if the present printing speed is one indicated by the flag B, then the correction values for speed B are read out from the memory. If the flag is off at steps S9 and S10, then program proceeds to steps S3 and S4, respectively.

As mentioned above, even if the image recording apparatus has more than one printing speeds, the printing operation may be carried out without color shift. It is to be noted that the described operation is so designed that the correction operation for color shift is not required to be frequently performed or one correction operation does not require too long a time. For example, when the cover of the apparatus has been closed, or power is on, the correction for color shift may be performed for a plurality of printing speeds or may be performed every time the printing speed is changed.

In the fourth embodiment, the image writing means has been described with respect to an LED head. However, the image writing means is not limited to the LED head and may be in the form of, for example, a laser head. The number of colors is not limited to four and may be any plural number of colors may be employed.

Fifth Embodiment

In the first embodiment, the black print engine 2K is located upstream of the yellow, magenta, and cyan print engines in the advance direction. As shown in FIG. 12, the black detection pattern is first transferred onto the carrier belt 12, and then one of the yellow, magenta, and cyan detection patterns over the black detection pattern. The intensity of light reflected back by the carrier belt 12 is the highest (brightest) at a block in which the black, yellow, magenta, and cyan detection patterns are printed with a maximum overlap. The intensity of light reflected back by the carrier belt 12 is the lowest (darkest) at a block in which the black, yellow, magenta, and cyan detection patterns are printed with a minimum overlap. When there is not a sufficient difference between the reflection coefficient of carrier belt Rb and the reflection coefficient of the black toner Rk, the intensity of light reflected back by the carrier belt 12 does not vary significantly from block to block, though the black, yellow, magenta, and cyan detection patterns are actually printed with significantly large deviations. Thus, a very small difference between Rb and Rk does not allow detection of color shift.

In a fifth embodiment, the black print engine is disposed at a location downstream of all other print engines with respect to the advance direction so that the black detection pattern is printed to cover the yellow, magenta, and cyan patterns.

FIG. 31 illustrates four different CASEs 1–4 in which the black detection pattern is printed on the color detection pattern with four different degrees of overlap.

If the reflection coefficients of colored toners, belt, and black toner are related such that Rc>Rb>Rk, the intensity of reflected light is the lowest (darkest) at a block in which the black, yellow, magenta, and cyan detection patterns are printed with a maximum overlap. Conversely, the intensity of reflected light is the highest (brightest) at a block in which the black, yellow, magenta, and cyan detection patterns are printed with a minimum overlap. Thus, the aforementioned properties can be used to determine color shift in the fifth embodiment.

In the fifth embodiment, exposed areas of color toner and carrier belt 12 vary from block to block and thus color shift can be determined in terms of exposed area even if the values of Rb and Rk are significantly different.

Meanwhile, if the values of Rb and Rc are not significantly different, the fifth embodiment fails to detect color shift. Therefore, a combined use of the first embodiment and fifth embodiment allows detection of color shift except for a case in which Rc=Rb=Rk.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image recording apparatus in which a plurality of images of different colors are printed in registration, comprising:

a medium transporting member, transporting a recording medium in an advance direction;

a first image-forming section, forming a first pattern on the medium transporting member, the first pattern including a plurality of first blocks aligned in the advance direction of the recording medium, each of the first blocks having first stripes aligned at first intervals in a traverse direction to the advance direction;

a second image-forming section, forming a second pattern over the first pattern, the second pattern including a plurality of second blocks aligned substantially in the advance direction, each of the second blocks having second stripes aligned at second intervals in the traverse direction, each of the second blocks being displaced ahead of a preceding one in the traverse direction;

a color shift detecting section, detecting a first amount of color shift in the transverse direction based on the first pattern and the second pattern; and a correcting section, correcting a position of an image that should be formed on the recording medium, the position of the image being corrected based on the first amount of color shift.

2. The image recording apparatus according to claim 1, wherein said color shift detecting section detects the first amount of color shift by measuring an intensity of light reflected by the detection pattern.

3. The image recording apparatus according to claim 2, wherein one of said image-forming sections disposed most upstream records a color image having a smallest reflection coefficient.

4. The image recording apparatus according to claim 2, wherein one of said image-forming sections disposed downstream records a color image having a smallest reflection coefficient.

5. An image recording apparatus in which a plurality of images of different colors are printed in registration, comprising:

a transporting member, transporting a recording medium in an advance direction;

a plurality of image-forming sections aligned in the advance direction, each said plurality of image-forming sections forming an image of a corresponding one of different colors on the recording medium and a detection pattern of the corresponding one of different colors on said transporting member, the detection pattern being one of a plurality of detection patterns that have a plurality of levels of resolution;

a color shift detecting section, detecting an amount of color shift based on the plurality of detection patterns; and a correcting section, correcting a position of the image that should be formed on the recording medium in accordance with the amounts of color shift, the position being first corrected based on a low level of resolution and then based on a high level resolution.

6. An image recording apparatus in which a plurality of images of different colors are printed in registration, comprising:

a transporting member, transporting a recording medium in an advance direction;

a plurality of image-forming sections aligned in the advance direction, each said plurality of image-forming sections recording an image of a corresponding one of different colors on a recording medium and a detection pattern of the corresponding one of different colors on said transporting member;

a color shift detecting section, detecting an amount of color shift based on two detection patterns recorded on the transporting member; and a correcting section, correcting a position of the image recorded on the recording medium, the position being corrected in accordance with the amount of color shift;

wherein said color shift detecting section detects the amount of color shift by measuring an intensity of light reflected by the detection pattern, wherein the detection pattern is one of a plurality of detection patterns that have a plurality of levels of resolution, wherein said color shift detecting section detects the amounts of color shift based on the plurality of detection patterns;

wherein said correcting section corrects a position of the image recorded on the recording medium in accordance with the amounts of color shift, the position being first corrected based on a low level of resolution and then based on a high level resolution.

7. The image recording apparatus according to claim 6, wherein said first image-forming section further forms a fifth pattern on the medium-transporting member, the fifth pattern having fifth stripes aligned at fifth intervals in the advance direction, each of the fifth stripes extending in an oblique direction at the advance direction;

wherein said second image-forming section further forms a sixth pattern over the fifth pattern, the sixth pattern having sixth stripes aligned at sixth intervals in the advance direction, each of the sixth stripes extending in the oblique direction;

wherein said color shift detecting section further detects a third amount of color shift in the advance direction and in the traverse direction based on the fifth pattern and the sixth pattern; and wherein said correcting section further corrects a position of the image that should be formed on the recording medium, the position of the image being corrected based on the third amount of color shift.

8. An image recording apparatus in which a plurality of images of different colors are printed in registration, comprising:

a transporting member, transporting a recording medium in an advance direction;

a plurality of image-forming sections aligned in the advance direction, each of said plurality of image-forming sections forming an image of a corresponding one of different colors on the recording medium and a detection pattern of the corresponding one of different colors on said transporting member, one of said plurality of image-forming sections forming a reference detection pattern on said transporting member;

a color shift detecting section, detecting an amount of color shift based on two detection patterns recorded on the transporting member and performing calibration based on the reference detection pattern; and a correcting section, correcting a position of the image that should be formed on the recording medium, the position being corrected in accordance with the amount of color shift.

9. An image recording apparatus in which a plurality of images of different colors are printed in registration, comprising:

a transporting member, transporting a recording medium in an advance direction;

a plurality of image-forming sections aligned in the advance direction, each of said plurality of image-forming sections forming an image of a corresponding one of different colors on the recording medium and a detection pattern of the corresponding one of different colors on said transporting member;

a color shift detecting section, detecting an amount of color shift based on two detection patterns formed on the transporting member, said color shift detecting section including a speed-switching section that causes said transporting member to run at one of a plurality of speeds according to a type of the recording medium, and said color shift detecting section detecting the amount of color shift for each of the plurality of speeds; and a correcting section, correcting a position of the image that should be formed on the recording medium, the position being corrected in accordance with the amount of color shift.

10. The image recording apparatus according to claim 7, wherein said color shift detecting section includes a pair of detectors that measure an intensity of light reflected back from the third detection pattern, and a circuit that selectively receives outputs of the pair of detectors.

11. The image recording apparatus according to claim 10, wherein the third detection pattern is aligned in two rows in a staggered configuration such that each of the two rows is at an end portion of said transporting member in the traverse direction.

12. An image recording apparatus in which a plurality of images of different colors are printed in registration, comprising:

a transporting member, transporting a recording medium in an advance direction;

a plurality of image-forming sections aligned in the advance direction, a first one of said plurality of image-forming sections forming a first pattern having first stripes aligned at first intervals on the transporting member, a second one of said plurality of image-forming sections forming a second pattern having second stripes aligned at second intervals on the transporting member;

a color shift detecting section, detecting an amount of light reflected back from each of the first pattern, the second pattern, and said transporting member, the first pattern, the second pattern, and the transporting member reflecting light with different reflection coefficients; and a correcting section, correcting a position of an image that should be formed on the recording medium, the position being corrected in accordance with the amount of color shift.

13. The apparatus according to claim 12, wherein the first pattern is a black pattern and the second pattern is a pattern of a color other than black, and wherein the amount of light is selected such that the amount of light reflected back from the second pattern is larger than that reflected back by said transporting member.

14. The apparatus according to claim 13, wherein said first image-forming section is disposed at a location most downstream of the advance direction.

15. The apparatus according to claim 12, wherein said first pattern is a black pattern that has a smaller reflection coefficient than do the second pattern and said transporting member.

16. The apparatus according to claim 12, wherein said first pattern is a black pattern and the second pattern is a pattern of a color other than black, and said transporting member has a larger reflection coefficient than the black pattern.

17. The apparatus according to claim 16, wherein said first image-forming section is disposed at a location most downstream of the advance direction.

18. The apparatus according to claim 12, wherein said color shift detecting section is located to oppose a roller that causes said transporting member to run.

19. The apparatus according to claim 12, wherein the first pattern and the second pattern are recorded substantially at a midway portion of said transporting member;

wherein said color shift detecting section is located to detect the first pattern and the second pattern recorded substantially at the midway portion of said transporting member.

20. The apparatus according to claim 12, wherein said color shift detecting section detects the amount of light reflected by using an equation:

$$R=(\alpha Rc+\beta Rk+\gamma Rb)/(\alpha+\beta+\gamma)$$

where:

$\alpha$ is a number of dots indicative of a width of an exposed part of the second pattern, $\beta$ is a number of dots indicative of a width of an exposed part of the first pattern, $\gamma$ is a number of dots indicative of a width of an exposed surface of said transporting member, Rc is a reflection coefficient of the second pattern, Rk is a reflection coefficient of the first pattern, and Rb is a reflection coefficient of said transporting member.

21. The image recording apparatus according to claim 5, wherein said color shift detecting section detects the amount of color shift by measuring an intensity of light reflected by each of the two detection patterns.

22. The image recording apparatus according to claim 8, wherein said transporting member is a carrier belt that attracts the recording medium thereto;

wherein said color shift detecting section detects the amount of color shift of a corresponding color from the two detection patterns of a same type recorded on said transporting member, the two detection patterns being one of a first type detection pattern for detecting color shift in the advance direction, a second type detection pattern for detecting color shift in a traverse direction perpendicular to the advance direction, and a third type detection pattern for detecting color shift in an oblique direction at an angle with the traverse direction.

23. The image recording apparatus according to claim 9, further comprising:

a memory that stores at least one of a first type detection pattern for detecting color shift in the advance direction, a second type detection pattern for detecting color shift in a traverse direction perpendicular to the advance direction, and a third type detection pattern for detecting color shift in an oblique direction at an angle with the traverse direction;

wherein said transporting member is a carrier belt that attracts the recording medium thereto;

wherein said color shift detecting section detects the amount of color shift of a corresponding color from the two detection patterns of a same type formed on the transporting member one of the first type detection pattern, the second type detection pattern, and the third type detection pattern.

24. The image recording apparatus according to claim 1, herein the detection pattern includes a plurality of blocks aligned in a row, each of the plurality of blocks having at least one stripe, wherein said first image-forming section further forms a third pattern on the medium-transporting member, the third pattern including a plurality of third blocks aligned in the advanced direction, each of the third blocks having third stripes aligned at third intervals in the advance direction;

wherein said second image-forming section further forms a fourth pattern over the third pattern, the fourth pattern including a plurality of fourth blocks aligned substantially in the advance direction, each of the fourth blocks having fourth stripes aligned at fourth intervals in the advance direction, each of the fourth blocks being displaced progressively ahead of a corresponding one of the third blocks in the advance direction;

wherein said color shift detecting section further detects a second amount of color shift in the advance direction based on the third pattern and the fourth pattern; and wherein said correcting section further corrects a position of the image that should be formed on the recovering medium, the position of the image being corrected based on the second amount of color shift.

* * * * *